(12) United States Patent  
Whitely et al.

(10) Patent No.: US 11,924,510 B2  
(45) Date of Patent: Mar. 5, 2024

(54) SYSTEMS, METHODS, AND DEVICES FOR DETERMINING VIEWERSHIP DATA

(71) Applicant: Comcast Cable Communications, LLC, Philadelphia, PA (US)

(72) Inventors: Christopher Paul Whitely, Summit, NJ (US); Zhao Xing, Livingston, NJ (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 216 days.

(21) Appl. No.: 17/035,167

(22) Filed: Sep. 28, 2020

(65) Prior Publication Data

US 2021/0099757 A1    Apr. 1, 2021

Related U.S. Application Data

(60) Provisional application No. 62/906,340, filed on Sep. 26, 2019.

(51) Int. Cl.
*H04N 21/442* (2011.01)
*H04N 21/45* (2011.01)
*H04N 21/475* (2011.01)

(52) U.S. Cl.
CPC . *H04N 21/44222* (2013.01); *H04N 21/44204* (2013.01); *H04N 21/4532* (2013.01); *H04N 21/4755* (2013.01)

(58) Field of Classification Search
CPC ....... H04N 21/44222; H04N 21/44204; H04N 21/4532; H04N 21/4755; H04N 21/2143; H04N 21/23418; H04N 21/2407; H04N 21/25435; H04N 21/25841; H04N 21/44213; H04N 21/44224; H04N 21/4667

See application file for complete search history.

(56) References Cited

U.S. PATENT DOCUMENTS

| | | | |
|---|---|---|---|
| 10,149,001 B1 * | 12/2018 | Sengupta | H04N 21/2181 |
| 2014/0032635 A1 * | 1/2014 | Pimmel | H04N 21/44227 709/227 |
| 2019/0373339 A1 * | 12/2019 | Bradley | H04L 9/0637 |

* cited by examiner

*Primary Examiner* — Nnenna N Ekpo  
(74) *Attorney, Agent, or Firm* — BakerHostetler

(57) ABSTRACT

Systems, methods, and devices relating to determining viewership data are described herein. In a method, viewing data associated with a household is received. A first portion of the viewing data is indicative of video programming associated with a first video device and a second portion of the viewing data is indicative of video programming associated with a second video device. One or more characteristics associated with the first and second portions of the viewing data are determined. Based on the one or more characteristics and a comparison of the respective video programming associated with the first and second video devices, it is determined that the first portion of the viewing data is duplicative, at least in part, with the second portion of the viewing data.

20 Claims, 11 Drawing Sheets

SYSTEMS, METHODS, AND DEVICES FOR DETERMINING VIEWERSHIP DATA

CROSS-REFERENCE TO RELATED APPLICATIONS

This application claims priority to U.S. Provisional Application No. 62/906,340 filed Sep. 26, 2019, which is incorporated by reference in its entirety.

BACKGROUND

Almost from the beginning of home television, audience viewership measurements have been an important metric for service providers, content producers, and advertisers. For example, advertising rates are often based on the estimated number and demographics of viewers for a given television program, television channel, and/or time segment. Audience viewership measurements may also guide content providers in selecting future projects. Yet recent advancements in technology have expanded content delivery channels beyond the traditional over-air broadcast and cable television models. Video programming may now be delivered to the home via a computer network (e.g., the Internet). For instance, a digital media player or other computing device with appropriate software may receive streamed video programming and output the video programming to a connected television. Yet this diverse set of video content delivery channels presents challenges in accurately determining audience viewership measurements.

These and other shortcomings are addressed in the present disclosure.

SUMMARY

Systems, methods, and devices relating to determining viewership data are described herein.

Viewership data may be determined based on viewing data that is captured and reported by various video devices at a household, such as set-top boxes, over-the-top video devices, network devices, and smart TVs. To provide a more accurate representation of actual viewing activity at a household, viewing data for that household may be analyzed to determine portions of the viewing data, if any, that may be duplicative with other portions. Duplicative viewing data may over-represent actual viewing activity at the household. For example, duplicative viewing data may indicate that a television program was viewed twice at a household when it was, in fact, viewed only once. Duplicative viewing data may be identified by receiving viewing data for the household. One portion of the viewing data may be indicative of video programming associated with a first video device and a second portion of the viewing data may be indicative of video programming associated with a second video device. Based on the viewing data, as well as other potential sources, one or more characteristics of the viewing data, the video programming indicated in the viewing data, the first and second video devices, and/or the household may be determined. The video programming associated with the first video device may be compared to the video programming associated with the second video device. Based on these characteristics and the comparison of the respective video programming, it may be determined whether the first portion of the viewing data is duplicative, at least in part, with the second portion of the viewing data. The duplicative portions of the first portion may be excluded from the viewing data before it is used for viewership analysis.

Further relating to determining viewership data, a model, such as a machine learning model, may be determined that is configured to output viewership data for a large-scale viewing audience based on an input of demographic information associated with the large-scale viewing audience. Viewership data may include ratings, viewing metrics, past viewing activity, or projected future viewing activity, for example. The model may be determined based on viewing data for a sample viewing audience and known demographic information for the sample viewing audience. The viewing data for the sample viewing audience may comprise viewing data from set-top boxes and viewing data from smart TVs (e.g., screen-level viewing data). The viewing data and the known demographic information for the sample viewing audience may be used as a set of training data for determining the model via machine learning techniques.

The model may be determined via ensemble learning in which a first model is determined based on the set-top box viewing data for the sample viewing audience and a second model is determined based on both the set-top box viewing data and the smart TV viewing data for the sample viewing audience. Ensemble learning techniques may be used on the first and second models to determine the final ensemble model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices.

Aspects of the disclosure will now be described in detail with reference to the drawings, wherein like reference numbers refer to like elements throughout, unless specified otherwise.

DETAILED DESCRIPTION

Systems, methods, and devices relating to determining viewership data are described. Viewership data for a large-scale viewing audience may be determined, at least in part, based on sample viewing data from a sample of viewing households that is reported by set-top boxes (e.g., video data output devices) and/or smart TVs (e.g., video display devices) at the respective households. Sample viewing data reported by a set-top box may be generally based on the video programming that is output by the set-top box and sample viewing data reported by a smart TV may be generally based on the video programming that is displayed by the smart TV (e.g., via automatic content recognition). In some instances, a household may have both a reporting set-top box and a reporting smart TV, which may potentially cause duplicative viewing data in the viewing data reported by the smart TV and set-top box, particularly if the set-top box is paired with the smart TV. However, the collective viewing data associated with the household may be analyzed to determine, based on one or more of various characteristics associated with the viewing data, portions of the viewing data that are duplicative with other portions of the viewing data. That is, duplicative portions of the viewing data may be determined that reflect viewing activity that is already indicated in the viewing data. The duplicative portions of the viewing data may be excluded (e.g., filtered out or disregarded) from the viewing data for any subsequent viewership analysis using the viewing data.

Additionally or alternatively, sample viewing data from set-top boxes and sample viewing data from smart TVs may be used, along with demographic information associated with the sample viewing data, as training data to determine a model via machine learning. For example, such training data may comprise viewing data generated by set-top boxes at households in which there is one or more reporting set-top boxes but no reporting smart TVs and viewing data generated by smart TVs at households in which there is one or more reporting smart TVs but no reporting set-top boxes. The viewing data from the smart TV-only households may have been scaled according to an analysis of viewing data from households with both one or more reporting set-top boxes and one or more reporting smart TVs. A machine learning model so-determined may be configured to receive demographic information associated with a large-scale viewing audience and determine viewership data for the large-scale viewing audience based on that demographic information. The viewership data may comprise ratings, viewing metrics, past viewing activity, or projected future viewing activity, for example.

Figure 1:
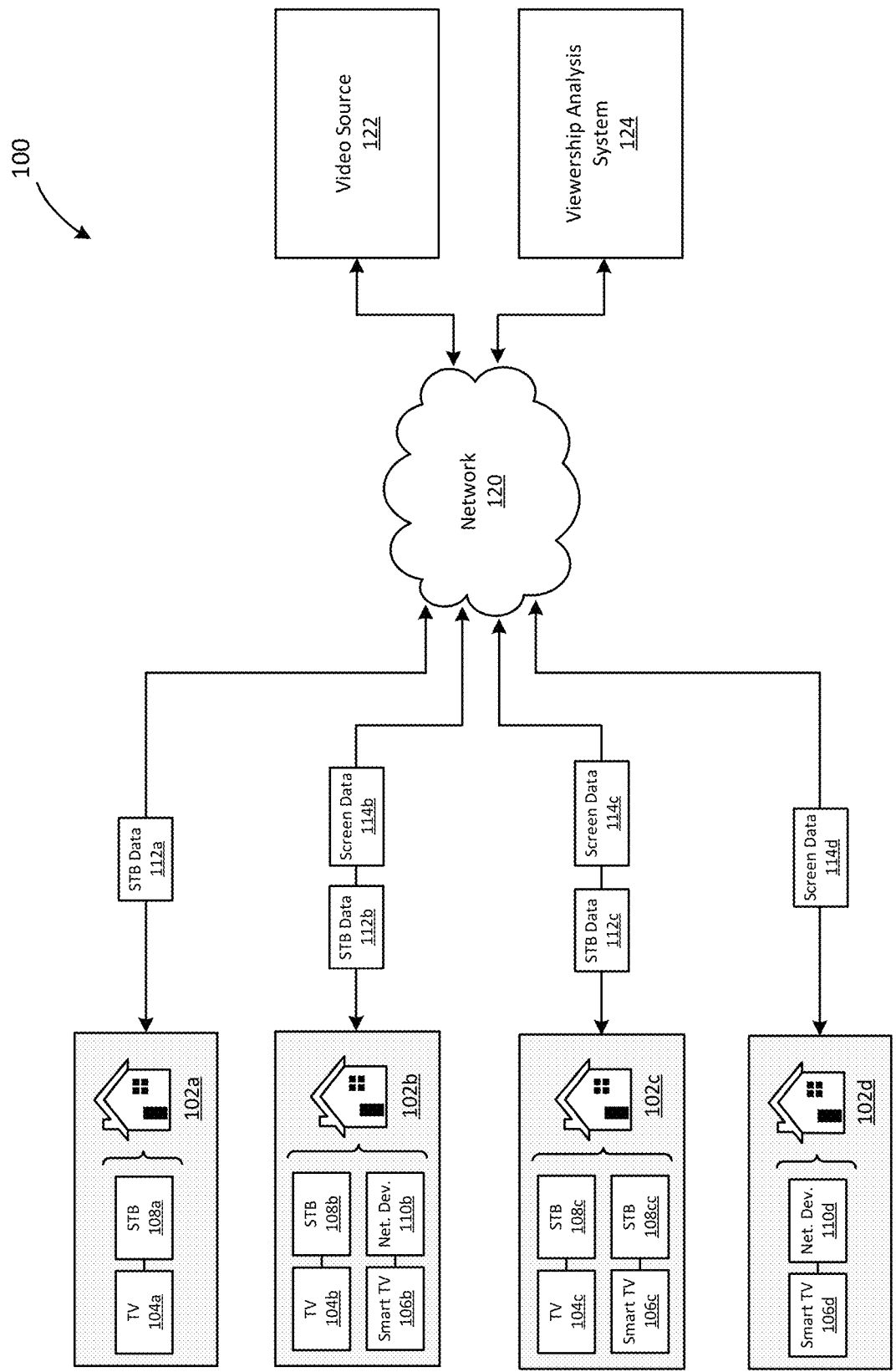
FIG. 1 illustrates an example block diagram of a system.

FIG. 1 illustrates an example block diagram of a system 100 in which the present systems, methods, and devices may be implemented. The system 100 comprises a series of households 102a-d (referred to generically as a household 102 or households 102) from which sample viewing data may be derived. Such sample viewing data may be based on viewing data representative, at least in part, of video programming received from a video source 122 and output (e.g., viewed) at the various households 102. The viewing data for the households 102 may be transmitted, via a network 120, to an external viewership analysis system 124 for processing and analysis. The households 102 may be regarded as a sample viewing audience for a larger viewing audience, such as a national viewing audience or a viewing audience for a media market (e.g., a DMA (designated market area)). The viewing data for the households 102, along with associated demographic data, may be used to determine a machine-learning model. The machine-learning model, in turn, may be used to determine viewership data for the larger viewing audience. The viewership data for the larger viewing audience may be used, for example, to determine viewing metrics (e.g., ratings) or project future viewership.

A household 102 may comprise a living unit for one or more people. A household 102 may comprise a detached house or residence (e.g., a single-family home). A household 102 may comprise a house or a unit in a multi-unit dwelling (e.g., an apartment building or condominium).

A household 102 may have one or more devices relating to video programming. A household 102 may have one or more devices, such as a set-top (STB) box 108, configured to output video programming to a video display device and determine viewing data indicating the output video programming. A household 102 may have one or more video display devices, such as a television 104, configured to display video programming. A video display device, such as a smart TV 106, may be further configured to determine viewing data representing video programming displayed by the video display device. A household 102 may have one or more network devices 110 configured to facilitate computer network communications to and from the household 102.

A television 104 may comprise a device configured to display video programming, including, but not limited to, a "standard" television (e.g., an LED or LCD flat-panel television), a projector, a computer display, or the like. It will be understood that a television 104 in the context of this disclosure is not configured to capture and report viewing data indicative of the video programming displayed on the television 104, although the television 104 may be capable of such a configuration. A television 104 may be connected to (e.g., wired or wirelessly) and receive a video data input from a set-top box 108.

A set-top box 108 may receive video data from an outside source (e.g., the video source 122) and convert the video data to a format usable by a television 104 or smart TV 106. The formatted video data transmitted to the television 104 or smart TV 106 may comprise the video programming for display to the viewer. The video data received by a set-top box 108 may comprise digital video data or analog video data. A set-top box 108 may be configured to receive video data via a cable input, such as a co-axial cable or a fiber-optic cable. A set-top box 108 may be configured to receive video data via an antenna, such as an over-air broadcast or video data from a satellite television system. A set-top box 108 may be configured to receive streaming video. A set-top box 108 or similar functionality may be integrated with a television 104 or smart TV 106.

A set-top box 108 may comprise a cable television set-top box configured to receive cable television programming, such as from a cable television provider. Such cable television programming may be subscription-based. The set-top box 108 may be configured to receive digital cable and/or analog cable. The set-top box 108 may be associated with the cable television provider. The set-top box 108 may be provided to the household 102 by the cable television provider. A set-top box 108 may comprise a satellite television set-top box, a digital media player, a digital television adapter, or a digital video recorder (DVR). A digital television adapter may convert a digital over-the-air broadcast to an analog signal. A set-top box 108 may be configured with a TV tuner.

A set-top box 108 may be configured to determine viewing data indicative of the video programming output by the set-top box 108 to a television 104 or smart TV 106. Such viewing data determined by a set-top box 108 may be referred to generically as STB (set-top box) data 112. STB data 112 may indicate video programming output by the set-top box 108 over a period of time. For example, STB data 112 may cover a day's or a week's worth of viewing. STB data 112 may be organized by time, including time spans and/or specific times (e.g., timestamps). STB data 112 may be determined based on periodic samples of the output video programming.

STB data 112 may indicate, for a given time, the video programming output by the set-top box 108. STB data 112 may indicate a channel and/or television network that the set-top box 108 was "tuned to" or that is otherwise associated with video programming output by the set-top box 108. STB data 112 may identify the video programming by name or other identifier. STB data 112 may further identify the video programming by episode (e.g., season 2, episode 15) or other sub-identifier, such as may be the case with an episodic, serial, or repeating video program series.

A smart TV 106 may be similar to a television 104 in some aspects. For example, a smart TV 106 may comprise a display (e.g., a flat panel LED or LCD display, projector, or computer display) to visually output video programming for viewing. Like a television 104, a smart TV 106 may be configured to receive a video input from a set-top box 108 and display the video programming received and formatted by the set-top box 108.

A smart TV 106 may be configured to determine viewing data indicative of, for a given time, video programming displayed by the smart TV 106. Viewing data determined by a smart TV 106 in this manner may be referred to generically as screen data 114. Screen data 114 may be similar to STB data 112 in some aspects, such as those aspects relating to form. Screen data 114 may indicate video programming displayed on a smart TV 106 over a period of time, such as a day or a week. Screen data 114 may be organized by time, including time spans and/or specific times (e.g., timestamps). Screen data 114 may be determined based on periodic samples of the displayed video programming.

Screen data 114 may indicate, for a given time, the video programming displayed by a smart TV 106. Screen data 114 may indicate a channel and/or television network associated with the video programming displayed by a smart TV 106. Screen data 114 may identify the video programming by name or other identifier. Screen data 114 may further identify the video programming by episode or other sub-identifier.

A smart TV 106 may use automatic content recognition (ACR) techniques to identify the displayed video programming. ACR techniques may be applied to a sample of a larger segment of video programming to determine screen data 114 associated with the larger segment. ACR techniques may be applied to a video component, an audio component, or both audio and video components of video programming to determine screen data 114 associated with the video programming. ACR techniques may include video fingerprinting, audio fingerprinting, or digital watermarking.

A smart TV 106 may be configured to receive and display video data from a video source other than via a set-top box 108. For example, a smart TV may be configured with one or more streaming video applications that receive and display streaming video. A smart TV 106 may be configured with a computer network interface, which may enable the smart TV 106 to communicate via a computer network (e.g., the network 120). For example, a smart TV 106 may communicate with the video source 122 via a computer network to receive a digital video stream. A smart TV 106 may use a computer network protocol, such as the TCP/IP protocol suite, to communicate with the video source 122 via a computer network.

Although the term "smart" is used in reference to the smart TVs 106 described herein, this term is used in a generic manner to indicate that such a television is configured to determine and report viewing data (e.g., screen data 114) based on video programming displayed by the television. The smart TVs 106 described herein are not limited, per se, to those televisions labeled or identified in various other contexts as "smart". For example, the smart TVs 106 described herein are not limited to those televisions labeled or identified in marketing material or product labeling as "smart".

It is possible in some circumstances for video programming to be output by a set-top box 108 to a smart TV 106 (and represented in associated STB data 112) yet not be actually displayed on the smart TV 106. Thus, even in a household 102 with only a single set-top box 108 and a single smart TV 106, the STB data 112 and screen data 114 covering the same period of time may differ, at least in part. This may be due to the screen data 114 being "glass-level" data. For example, a viewer may watch video programming provided via a set-top box 108. Having decided that he or she no longer wishes to watch television, the viewer may turn off the smart TV 106. Yet the set-top box 108 may remain turned on and continue to output video programming to the turned-off smart TV 106 for some additional period of time. This non-displayed video programming may be reflected in STB data 112 but not the corresponding screen data 114. Steps taken to account for these circumstances may be referred to as truncation. For example, truncation may include filtering STB data 112 or disregarding some portions of STB data 112 in viewership analysis.

STB data 112 and/or screen data 114 may be filtered to exclude time-shifted viewing. Time-shifted video programming may include live broadcast video programming that was recorded for later viewing. For example, time-shifted viewing may include viewing video programming stored on a DVR system. STB data 112 and/or screen data 114 may be filtered based on a time difference between when time-shifted video programming is output by a set-top box 108 or displayed on a smart TV 106 and when that video programming is otherwise broadcast (e.g., broadcast according to the video programming's regular schedule). For example, video programming that is time-shifted by six hours or more may be filtered out of STB data 112 and/or screen data 114. STB data 112 and/or screen data 114 may be filtered based on a distribution categorization of the video programming. Distribution categories (e.g., attributes) of video programming may comprise HD-TV (high definition television, e.g., high definition broadcast television), SD-TV (standard definition television, e.g., standard definition broadcast television), video programming provided via an application ("app") executing on the television (e.g., a video streaming application), and video programming provided via an over-the-top (OTT) distribution channel (e.g., streaming video via a stand-alone or set-top digital media player). For example, STB data 112 and/or screen data 114 may be filtered to exclude viewing data associated with televisions 104 or smart TVs 106 for which HD-TV is not the majority distribution category.

A network device 110 may facilitate access to the network 120 for one or more devices at an associated household 102. For example, a network device 110 may facilitate access to computer network portions of the network 120, such as the Internet. A network device 110 may facilitate TCP/IP communications of a smart TV 106 or set-top box 108, such as for receiving streaming video. A network device 110 may comprise a router, gateway, switch, modem, or combination thereof. A smart TV 106 or set-top box 108 may connect to a network device 110 wirelessly (e.g., via Wi-Fi) or via a wired connection (e.g., via ethernet).

The network 120 may facilitate communications between the various components shown in FIG. 1. The network 120 may comprise a private portion. The network 120 may comprise a public portion. The network 120 may comprise a content distribution and/or access network. The network 120 may comprise a cable television network. The network 120 may facilitate communication via one or more communication protocols. The network 120 may comprise fiber, cable, or a combination thereof. The network 120 may comprise wired links, wireless links, a combination thereof, and/or the like. The network 120 may comprise routers, switches, nodes, gateways, servers, modems, and/or the like.

The video source 122 may provide video data (e.g., bearing video programming) to a household 102, such as to one or more televisions 104, set-top boxes 108, smart TVs 106, or network devices 110 at the household 102, if any. The video source 122 may comprise a headend, a video on-demand server, a cable modem termination system, the like, and/or any combination of the foregoing. The video source 122 may receive a request for video data from a content delivery system and/or a device at a household 102.

The viewership analysis system 124 may comprise one or more networked computing devices, such as one or more servers. The viewership analysis system 124 may comprise a storage system, such as one or more databases. The viewership analysis system 124 may receive viewing data, such as STB data 112 and/or screen data 114, from one or more households 102. Based on the viewing data, the viewership analysis system 124 may determine viewership data associated with the reporting households 102. The viewership analysis system 124 may determine viewership data associated with a different (e.g., larger) viewing audience than the viewing audience made up of the reporting households 102 and/or the reporting household 102 viewing audience may comprise a sub-population or sample within a larger viewing audience.

Viewership data may comprise viewership metrics (e.g., ratings) for the associated viewing audience. Viewership data may comprise projected future viewing activity or projected future viewership metrics for the associated viewing audience. Viewership data may be associated with a particular television network. Viewership data may be associated with particular video programming. Viewership data may be associated with a particular telecast of video programming. Viewership data may be associated with a particular repeating video programming series, such as a nightly news program or a situational comedy program that is broadcast weekly. Viewership data may be associated with a particular episode or other sub-part of a repeating video program series. Viewership data may indicate a probability that a household views particular video programming (e.g., a television/cable network or channel) and for how long.

The households 102a-d illustrate some examples of the various combinations of devices that may be used at a household 102, although the disclosure is not so limited. The set-top boxes 108 in FIG. 1 may have a common association. For example, the set-top boxes 108 in FIG. 1 may be associated with a particular service provider, such as a television service provider. It will be understood that the example smart TVs 106 and set-top boxes 108 shown at the various households 102a-d are configured to determine screen data 114 and STB data 112, respectively.

The household 102a has a television 104a and a connected set-top box 108a. STB data 112a may be determined for the household 102a since the household 102a has a set-top box 108a so-configured. But since the household 102a does not have a smart TV 106, no screen data 114 is determined for the household 102a.

The household 102b has a smart TV 106b connected to a network device 110b. The network device 110b at the household 102b may enable the smart TV 106b to receive streaming video, for example. The household 102b further has a television 104b and a connected set-top box 108b. Both STB data 112b and screen data 114b may be determined for the household 102b since the household 102b has both the set-top box 108b and the smart TV 106b.

The household 102c has a television 104c and a connected first set-top box 108c. The household 102c further has a smart TV 106c and a connected second set-top box 108cc. STB data 112c may be determined by the first set-top box 108c and the second set-top box 108cc. The STB data 112c may indicate video programming output by the first set-top box 108c to the television 104c and/or video programming output by the second set-top box 108cc to the smart TV 106c. Screen data 114c for the household 102c may be determined by the smart TV 106c and indicate video programming displayed on the smart TV 106c.

There is the potential for at least some overlap (e.g., duplicative viewing data) in the viewing activity represented in the STB data 112c and screen data 114c because the smart TV 106c and the second set-top box 108cc may independently determine viewing data representing the same viewing activity at the smart TV 106c. Further, it may not be fully relied upon that the respective viewing data captured by the smart TV 106c and the second set-top box 108cc match because the second set-top box 108cc may potentially continue to capture viewing data reflecting video programming output by the second set-top box 108cc after the smart TV 106 is turned off and no longer displaying video programming. The smart TV 106c may also display video programming that was not output to the smart TV 106c by the second set-top box 108cc, such as streaming video received via a computer network. A similar problem with overlapping (e.g., duplicative) viewing activity may also potentially occur with respect to the household 102b and its associated STB data 112b and screen data 114b. For example, it may not be known whether the STB data 112b is from a set-top box 108 that is paired with a smart TV 106 reporting, at least in part, the screen data 114b, and vice versa.

The household 102d has a smart TV 106d and a network device 110d. The network device 110d at the household 102d may enable the smart TV 106d to receive streaming video, for example. Screen data 114d for the household 102d may be determined by the smart TV 106d. No STB data 112 may be determined for the household 102d since no set-top box 108 is present. Although not shown in FIG. 1, the smart TV 106d may receive video programming from a set-top box that does not report STB data 112. For example, such a set-top box may not have any association with the other set-top boxes 108 shown in FIG. 1 and/or the viewership analysis system 124.

The foregoing are only examples of the possible configurations of devices at a household 102. Any combination and number of devices are contemplated by this disclosure. As a further example configuration, a household 102 may have multiple televisions 104 each receiving video programming from respective set-top boxes but only a subset of those set-top boxes reports STB data 112—some simply may be not configured or capable of doing so. For instance, a household 102 may have one set-top box 108 that reports STB data 112 and several other set-top boxes that do not report STB data 112. Although it is again noted that the set-top boxes 108 and smart TVs 106 shown in FIG. 1 are assumed to be configured to capture and report viewing data. As another example configuration, a household 102 may have one or more televisions 104 that receive and display video programming from a source other than a set-top box 108. Such television(s) 104 may receive video programming from over-the-air broadcasts or digital video streaming, for instance. In this example configuration, viewing activity for the over-the-air broadcasts or streamed video at the television(s) 104 may go unreported. In either of these additional examples or similar, there may be viewing activity that goes unreported via screen data 114 and/or STB data 112 for the household 102. Scaling techniques may be used on screen data 114 and/or STB data 112 that is indeed reported for the household 102 to account for this unreported viewing activity.

Figure 2:
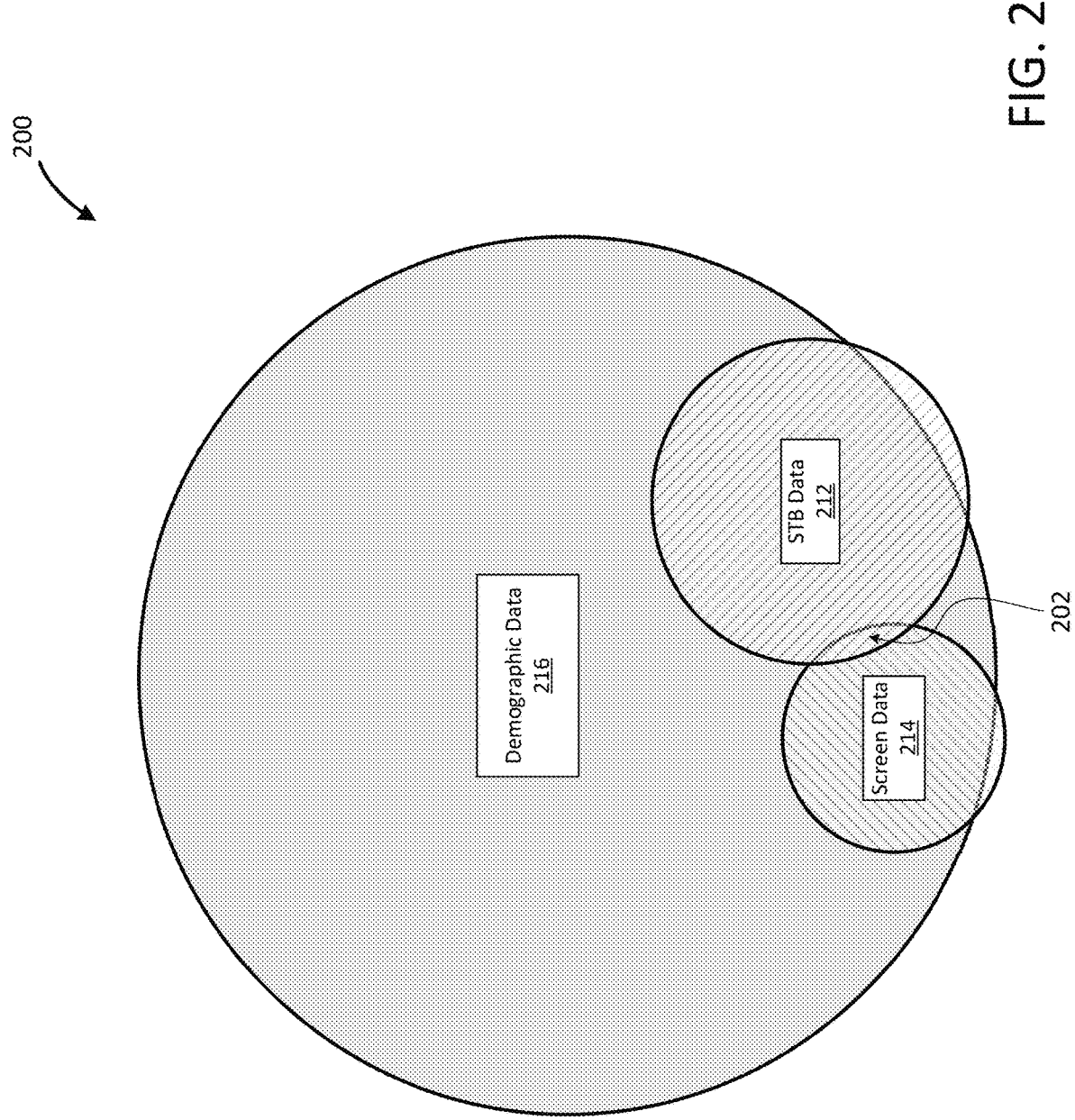
FIG. 2 illustrates an example data set diagram.

FIG. 2 illustrates an example diagram 200 of various sets of data that may be used in the present disclosure and the relationships therebetween. These sets of data include demographic data 216, STB (set-top box) data 212, and screen data 214. The STB data 212 and screen data 214 may be the same as or similar to the STB data 112 and screen data 114 of FIG. 1, respectively, in at least some aspects. As such, the STB data 212 may be captured by set-top boxes (e.g., a set-top box 108 of FIG. 1) and represent video programming output by the set-top boxes to a television or smart TV. The screen data 214 may be captured by smart TVs (e.g., a smart TV 106 of FIG. 1) and reflect video programming displayed by the smart TV. The STB data 212 and the screen data 214 represented in FIG. 2 may be aggregated STB data 212 and screen data 214, respectively, from the reporting households.

The demographic data 216 may reflect demographic data for a subject viewing audience. For example, the demographic data 216 may cover the viewing audience of a city, a metropolitan area, a media market (e.g., a designated market area), a state, a sub-region of a country, or a country as a whole. The viewing audience representing by the demographic data 216 may also be defined according to one or more demographic attributes, such as demographic data for those households with no children. Although it is noted that the demographic data 216 may not be completely comprehensive with respect to the subject viewing audience. Rather, the demographic data 216 may cover only a portion of the subject viewing audience. The demographic data 216 may be on a household basis so that it may be aligned with screen data 214 and STB data 212, which may also be on a household basis. Various demographic attributes that may be reflected in the demographic data 216 may include, on a per-household basis, one or more of age, presence of women, presence of children, presence of men, entertainment spend, home ownership, income, education, ethnicity, language, occupation, property type, rural or urban setting, length of residency, media market, number of video data output devices, number of video display devices, and person count.

As seen in FIG. 2, the demographic data 216, the STB data 212, and the screen data 214 overlap with one another to varying degrees. For example, the demographic data 216 overlaps with the majority of both the STB data 212 and screen data 214. There is a slight overlap (the area 202) between the STB data 212 and the screen data 214, although the STB data 212 and the screen data 214 may be largely independent of one another. For example, the majority of households reporting screen data 214 may not also report STB data 212 and, conversely, the majority of households reporting STB data 212 may not also report screen data 214. Although some households may report both, which may be referred to as "common households." The households 102b and 102c in FIG. 1 may be examples of common households. The common household data 622 in FIG. 6A may be an example, at least in part, of the overlapping STB data 212 and screen data 214 in the area 202.

The overlapping area of the demographic data 216 and the STB data 212 in FIG. 2 may represent those households that report STB data 212 and for which demographic data is known. Likewise, the overlapping area of the demographic data 216 and the screen data 214 may represent those households that report screen data 214 and for which demographic data 216 is known. As reflected by the large portion of the demographic data 216 that overlaps with neither the screen data 214 nor the STB data 212, demographic data 216 may be known for numerous households that report neither screen data 214 nor STB data 212.

Numerous advantages for viewership analysis may be realized due, at least in part, to the overlapping (and non-overlapping) relationship between the demographic data 216, STB data 212, and screen data 214. With respect to the portions of the STB data 212 and screen data 214 that do not overlap, this data may be leveraged to expand the pool of viewing data available for use in determining viewership data for a larger viewing audience than that represented in the STB data 212 and/or the screen data 214 alone. With respect to the portions of the STB data 212 and the screen data 214 that do overlap with each other (the area 202), this data may be leveraged to determine improved scaling factors for scaling the non-overlapping portions of the screen data 214 and STB data 212. The overlapping portions of the STB data 212 and the screen data 214 may be used to identify any matched devices at a household (pairs of connected set-top boxes and smart TVs). Knowledge of the matched pairs may be used in truncating STB data to account for video programming output by a set-top box but not displayed or viewed. The overlapping portions of the STB data 212 and the screen data 214, as well as knowledge of the matched pairs, may be used to determine duplicative viewing data in STB data and/or screen data that represents the same viewing activity. Such duplicative viewing data may be filtered or disregarded, at least in part, from viewership analysis.

Figure 3:
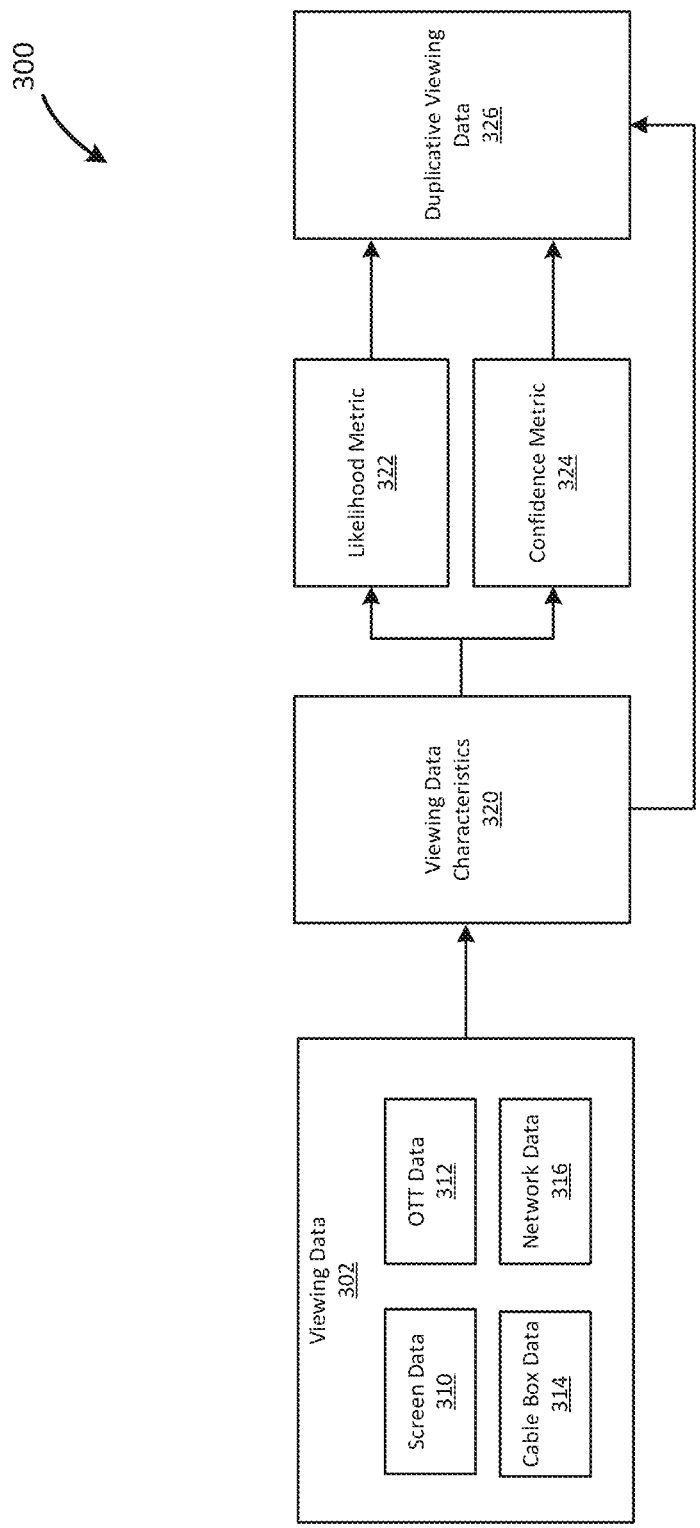
FIG. 3 illustrates an example data flow diagram.

FIG. 3 illustrates an example data flow diagram 300. In the data flow diagram 300, duplicative viewing data 326 may be identified in reported viewing data 302. One or more viewing data characteristics ("characteristics") 320 may be determined based on the viewing data 302, as well as other data sources. Based on the characteristics 320, a likelihood metric 322 may be determined that indicates a likelihood that portions of the viewing data 302 are duplicative, i.e., the duplicative viewing data 326. Additionally or alternatively, a confidence metric 324 (e.g. a confidence interval or level) may be determined, based on the characteristics 320, that indicates the confidence at which the duplicative viewing data 326 may be determined. The duplicative viewing data 326 may be excluded, filtered out, or disregarded in analyzing the viewing data 302 to determine viewership data. Viewership data may include ratings, viewing metrics, past viewing activity, or projected future viewing activity, for example.

The viewing data 302 may comprise data captured and reported by one or more video devices at (or associated with) a household and representing, at least in part, viewing activity at the household. It is useful for the viewing data 302 to accurately reflect the viewing activity at the household, yet duplicative viewing data in the captured viewing data 302 may frustrate these efforts. Duplicative viewing data may refer to portions of the viewing data 302 that represent the same actual viewing activity. For example, a cable set-top box and a smart TV at a household may both report viewing data. However, if a viewer at the household watches video programming on the smart TV and the video programming was received from the cable set-top box, the viewing data reported by the set-top box and the smart TV may collectively represent this viewing activity twice-over since the viewing data from the smart TV is based on video programming displayed by the smart TV, whereas the viewing data from the set-top box is based on video programming output by the set-top box. Such over-representation may skew any viewership analysis that uses this viewing data.

The viewing data 302 may comprise viewing data reported by one or more video devices at or associated with the household, including video data output devices and/or video display devices. The viewing data 302 may comprise viewing data reported by two or more video devices. Thus, the viewing data 302 may comprise portions associated with one video device and portions associated with another video device. The viewing data 302 may comprise screen data 310, OTT data 312, cable box data 314, and network data 316.

The screen data 310 may comprise viewing data reported by a video display device, such as a smart TV. The screen data 310 may represent video programming displayed by the video display device. The screen data 310 may be the same as or similar to, in at least some aspects, the screen data 114 (e.g., the screen data 114b, 114c, and/or 114c) in FIG. 1. The screen data 310 may comprise "glass-level" viewing data. The screen data 310 may be determined via automatic content recognition (ACR).

The cable box data 314 may comprise viewing data reported by a video data output device that receives video data over a closed or private network, such as a closed network associated with a cable television provider or a satellite television provider. Such video data output device may comprise a cable set-top box. The OTT data 312 may comprise viewing data reported by an over-the-top video data output device ("OTT device"). An OTT device may output video that was received over an open or public network, such as the Internet. An OTT device may comprise a digital media player configured to receive and output streaming video, for example. While an OTT device and a cable set-top box may both constitute a set-top box (e.g., a set-top box 108 in FIG. 1) as used elsewhere herein, a distinction is made between the two with respect to FIGS. 3 and 4 and corresponding descriptions. A cable set-top box may receive video data via a closed or private network while an OTT device may receive video data via an open or public network. The cable box data 314 and/or the OTT data 312 may be the same as or similar to, in at least some aspects, the STB data 112 (e.g., the STB data 112a, 112b, 112c) in FIG. 1, notwithstanding the noted distinction between a cable set-top box and an OTT device.

The network data 316 may comprise viewing data reported by a network device. Such a network device may comprise a router, gateway, modem, or wireless access point at a household. The network data 316 may additionally or alternatively comprise viewing data reported by a system or device at an external video source. For example, a video streaming service may report viewing data that indicates a video stream sent to a device at the household. The video data associated with the network data 316 may comprise unformatted video data that must be formatted for display. An OTT device (reporting or not) or an application executing on a smart TV or TV, for example, may format such video data for display.

The characteristics 320 associated with the viewing data 302 may be determined based on the viewing data 302 or other sources of data. A characteristic 320 may be with respect to the household, one or more of the video devices reporting the viewing data 302, the video programming represented in the viewing data 302, or the viewing data 302 itself.

Figure 5:
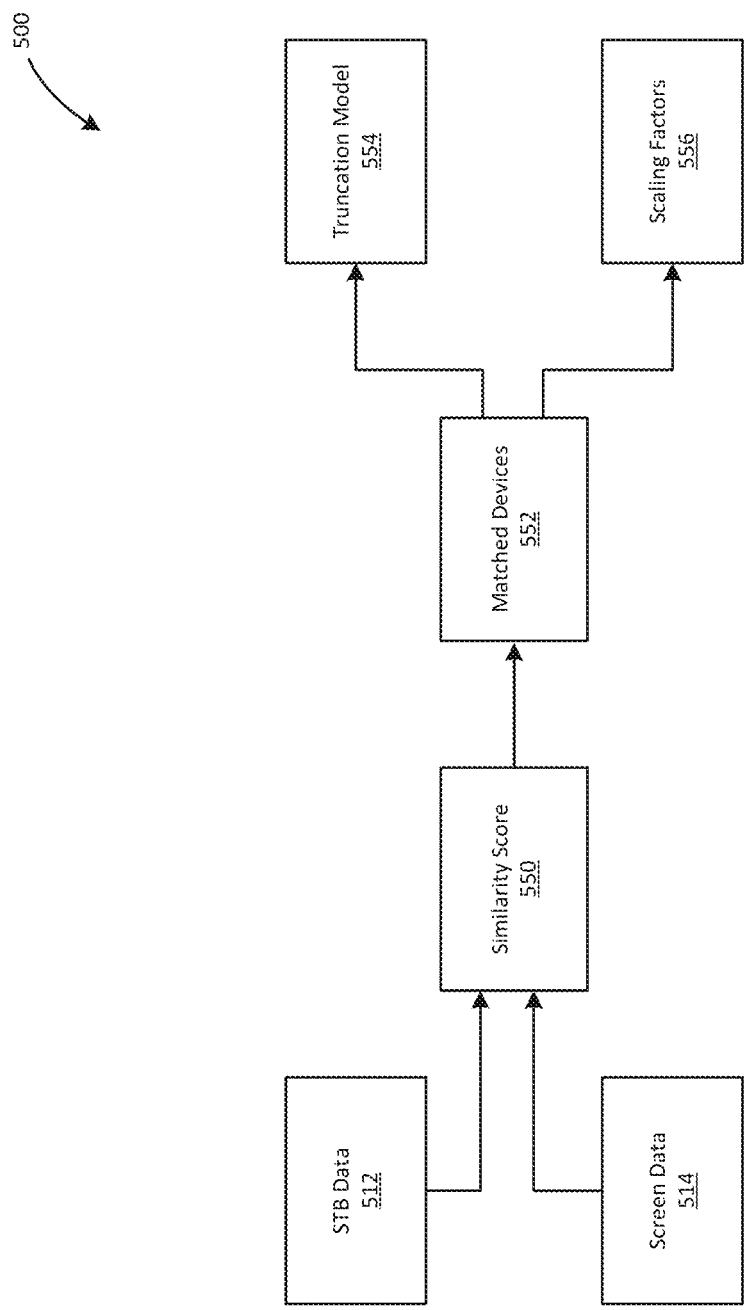
FIG. 5 illustrates an example data flow diagram.

A characteristic 320 may indicate whether two or more of the reporting video devices are matched devices, such as a matched pair (or more) of a matched video display device and a matched video data output device (e.g., the matched devices 552 of FIG. 5). A matched video data output device may be configured to output video programming to a matched video display device and the matched video display device may be configured to display the video programming received from the video data output device. For example, a matched pair may comprise a reporting smart TV and a reporting set-top box connected to the smart TV and configured to output a video signal to the smart TV. As another example, a matched pair may comprise a reporting smart TV and an external video streaming source that reports viewing data for video data transmitted (e.g., streamed) to the household, which may or may not be displayed via the reporting smart TV. More than one video data output device may be matched with a video display device. Likewise, more than one video display device may be matched with a video data output device. As an example, an OTT device, a cable set-top box, and a network device may be connected to and configured to selectively output video data to the same smart TV. Determining the matched pair or set of video devices may be performed in a similar manner as that described in relation to the matched devices 552 of FIG. 5 or step 1030 of FIG. 10. Determining the matched devices may be done prior to analyzing the viewing data 302 for duplicative viewing data. Thus, this characteristic 320 may comprise a classification of two or more video devices as matched devices, if so applicable. A characteristic 320 may additionally or alternatively indicate a similarity score with respect to the two or more reporting video devices, such as the similarity score 550 in FIG. 5.

A characteristic 320 may comprise one or more IP addresses associated with the reporting video devices and/or one or more IP addresses associated with a video data source. For example, the IP address associated with the source of a received video stream may be known. As another example, one or more of the reporting video devices may have an assigned IP address. The one or more IP addresses may be indicated in the viewing data 302, such as in metadata of the viewing data 302.

A characteristic 320 may indicate a video quality classification of the video programming represented in the viewing data 302, such as SD (standard definition) video, HD (high definition) video, or Ultra HD video. SD video may include 480p, 480i, or lower resolution. HD video may include 720p, 1080i, 1080p, and 1440p. Ultra HD video may include 2000, 2160P (4K UHD), 2540p, 4000p, and 4320p (8K UHD).

A characteristic 320 may indicate if the household associated with the viewing data 302 is HD-dominant or SD-dominant. In an HD-dominant household, the majority of video programming consumed is HD quality. In an SD-dominant household, the majority of video programming consumed is SD quality. The household may be additionally or alternatively classified as Ultra HD-dominant in a similar manner.

A characteristic 320 may indicate an input categorization with respect to any screen data 310 in the viewing data 302. An input categorization may indicate a characteristic of the input (e.g., the video input signal) of the video data or programming (represented in the screen data 310) to the associated smart TV. For example, an input categorization may indicate an input interface of the smart TV via which the video data or programming is received, such as HDMI. As another example, an input categorization may indicate whether the video data or programming was received via an SD-TV input to the smart TV or via an HD-TV input to the smart TV. As another example, an input categorization may indicate that the video data or programming was received via an OTT input to the smart TV. As another example, an input categorization may indicate that the video data or programming was received or generated by an application executing on the smart TV, such as an application to select and display a streaming video. Additionally or alternatively, discrete input categorizations may include "OTT," "App," "SD-TV," or "HD-TV." Such discrete input categorizations may be mutually exclusive with one another.

A characteristic 320 may indicate the volume or density of the reported viewing data 302. For example, imperfections in capturing and reporting viewing data may result in "holes" in the viewing data 302 in which no video programming is reported, although it is believed that there should be. Automatic content recognition may be unable to identify the displayed video programming at all times or there may be delays, for instance. This also indirectly relates to whether the video programming is in SD or HD since there may be some distortions in the aspect ratios of SD video when it is displayed, making content recognition more difficult.

Based on the characteristics 320, a likelihood metric 322 is determined that indicates a likelihood that a particular portion of the viewing data 302 is duplicative with one or more other portions of the viewing data 302. Additionally or alternatively, based on the characteristics 320, a confidence metric 324 is determined that indicates the confidence at which the duplicative viewing data 326 may be determined.

With regard to the characteristic 320 indicating whether two or more of the reporting video devices are matched with one another, the reporting video devices being classified as matched may tend to increase the likelihood that the viewing data 302 contains duplicative viewing data while an indication that the two or more reporting video devices are not matched with one another may tend toward the opposite. For example, if a video display device and a video data output device are unconnected to each other, it is unlikely that the video programming output by the video data output device is the same as that displayed by the video display device. Similarly, a determination that the two or more reporting video devices are matched may increase the confidence of any subsequent determination that the subject portions of viewing data 302 are duplicative or a determination that the two or more reporting video devices are not matched may decrease this confidence.

With regard to the characteristic 320 relating to IP address(es) associated with the reporting video devices and/or a video data source, a determination, for example, that the IP address of the video data source for the video programming displayed and/or output by a first video device is the same as the IP address of the video source for the video programming displayed and/or output by a second video device may tend to indicate an increased likelihood of duplicative viewing data. For example, a portion of the viewing data 302 associated with the first video device may indicate the same source IP address as that indicated in an analogous portion of the viewing data 302 associated with the second video device. In this case, there may tend to be an increased likelihood that at least one of these portions comprise duplicative viewing data.

With regard to the characteristic 320 indicating a video quality classification of the video programming represented in the viewing data 302, a video quality classification of HD video (or other indication of high video quality) for either portions of the viewing data 302 may tend to increase the confidence level of any subsequent determination (if any) that the portions of the viewing data 302 being analyzed comprise duplicative viewing data. For example, HD video may be more easily and accurately analyzed to determine the constituent video programming than SD video, particularly with respect to automatic content recognition by a smart TV. Further, a determined difference with respect to the video quality classifications for a portion of the viewing data 302 reported by one video device and a portion of the viewing data 302 reported by another video device may tend to decrease the likelihood of duplicative viewing data. For example, it is less likely that a video display device displays the same video programming as that output by a video data output device if the video programming output by the video data output device is in HD but the video programming displayed by the video display device is in SD, or vice versa. The opposite may be true if the video quality classifications are the same for the several portions of the viewing data 302.

With regard to the characteristic 320 indicating whether the household is SD-, HD-, or Ultra HD-dominant, an HD-dominant household may tend to increase the confidence level of any determination of duplicative viewing data (and Ultra HD-dominant even more so). For example, as noted above, higher quality video data may be more accurately analyzed to determine its constituent video programming. Consistent with the above-noted challenges associated with analyzing lower quality video data (e.g., SD video), viewing data associated with such low quality video may have a number of holes or missing data points. Thus, low quality video data may be associated with a lower level of confidence in any determination of duplicative viewing data. With similar regard to the characteristic 320 relating to the volume or density of the viewing data 302, a greater volume and/or density of the viewing data 302 may also tend to increase the confidence level of any determination of duplicative viewing data.

With regard to the characteristic 320 indicating an input categorization for any screen data 310 in the viewing data 302, this may be compared to an analogous categorization for other portions of the viewing data 302. For example, if the input categorization for a screen data 310 portion is OTT and the portions of the viewing data 302 are associated with a cable set-top box, this may tend to decrease the likelihood of duplicative viewing data.

The likelihood metric 322 and/or the confidence metric 324 may be additionally or alternatively determined based on the time or time periods associated with the respective portions of the viewing data 302 be analyzed. A time or time period associated with a portion of the viewing data 302 from a video display device may comprise the time or time period at which the video programming is displayed on the video display device. A time or time period associated with a portion of the viewing data 302 from a video data output device may comprise the time or time period at which the video data output device output the video data. Determining the likelihood metric 322 and/or the confidence metric 324 may comprise a comparison of the respective times or time periods associated with the portions of the viewing data 302 being analyzed for duplicative viewing data. For example, such a comparison may comprise determining the temporal overlap, if any, between a time period associated with a first portion of the viewing data 302 (e.g., display time(s) of a portion associated with a video display device) and a time period associated with a second portion of the viewing data 302 (e.g., output time(s) of a portion associated with a video data output device). Determining a high degree of temporal overlap (e.g., satisfy an overlap threshold) between the time periods may tend to indicate a higher likelihood that the respective portions of the viewing data 302 comprise duplicative viewing data. Conversely, no overlap (or only a slight degree of overlap) may tend to indicate a lower likelihood for duplicative viewing data. In addition, there may be a higher level of confidence in determining that portions of the viewing data 302 comprise duplicative viewing data where there is a high degree of temporal overlap between the portions. For example, a large number or holes or missing data points in one or both of the portions may be ignored if the respective start and end times associated with the portions closely align.

The likelihood metric 322 and/or the confidence metric 324 may be additionally or alternatively based on the respective networks or video assets (e.g., show, movie, etc.) associated with the portions of the viewing data 302 being analyzed for duplicative viewing data. For example, if the display times and the output times temporally match to a sufficient extent (e.g., satisfy an overlap threshold) and the video programming is associated with a common network and/or video asset, this may tend to increase the likelihood of duplicative viewing data.

Based on the characteristics 320, the likelihood metric 422, and/or the confidence metric 324, the duplicative viewing data 326 may be determined. The duplicative viewing data 326 may comprise a portion of the viewing data 302 that is determined to be duplicative with one or more other portions of the viewing data 302. Determining the duplicative viewing data 326 may comprise identifying any portions of the viewing data 302 that are determined as being duplicative with one or more other portions of the viewing data 302. Additionally or alternatively, determining the duplicative viewing data 326 may comprise determining whether a particular first portion of the viewing data 302 (e.g., screen data 310) is duplicative with another particular portion of the viewing data 302 (e.g., cable box data 314) based on the likelihood metric 322 and confidence metric 324 associated with these two portions. These two particular portions may be initially associated with one another, such as having overlapping time periods and/or being associated with common video programming or channel selection. Determining that a portion of the viewing data 302 is duplicative with one or more other portions of the viewing data 302 may comprise determining that the likelihood metric 322 and/or confidence metric 324 associated with these portions of viewing data 302 satisfy respective thresholds.

The duplicative viewing data 326 may be excluded (e.g., filtered out or disregarded) in any subsequent viewership analysis based on the viewing data 302. For example, if a portion of the screen data 310 is determined to be duplicative with a portion of the cable box data 314, the portion of the screen data 310 may be excluded while the portion of the cable box data 314 may be included in any viewership analysis.

Figure 4:
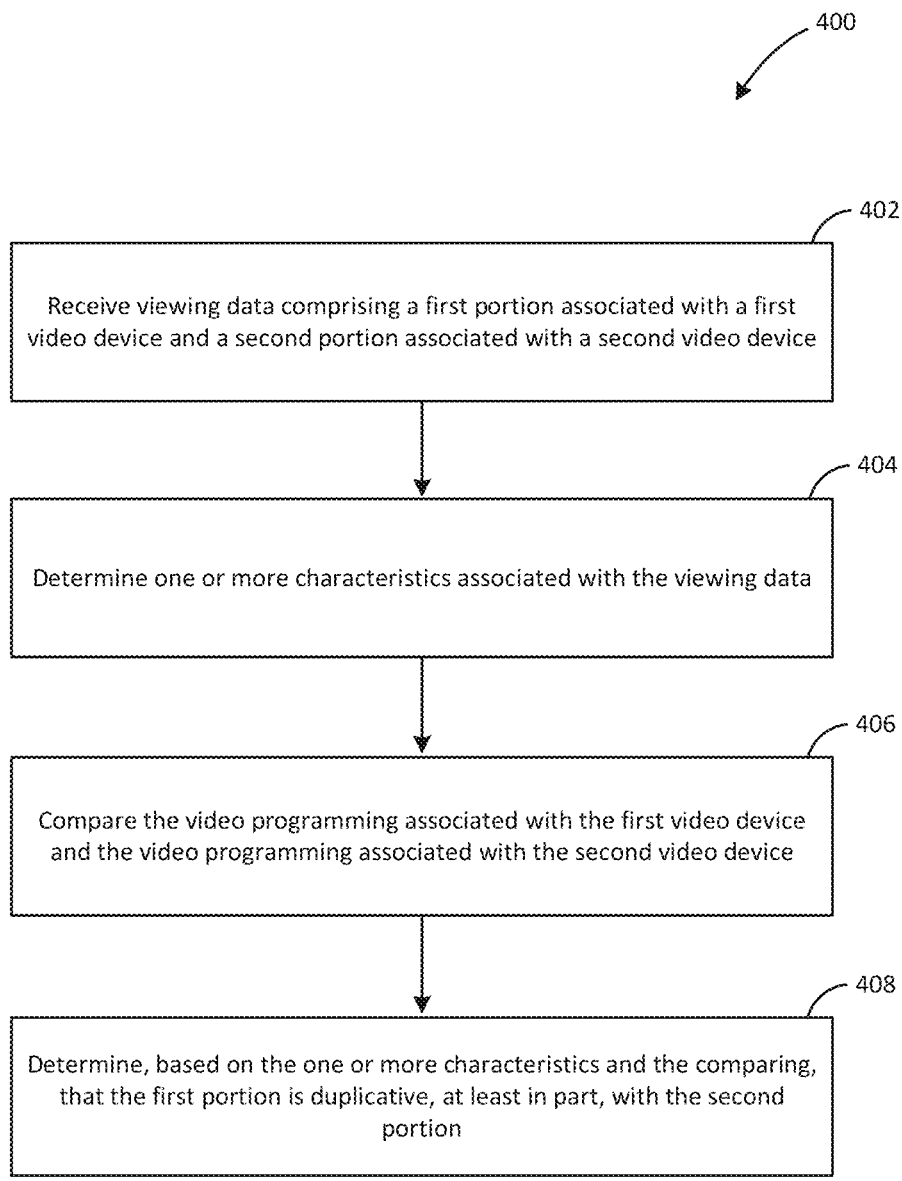
FIG. 4 illustrates an example method flow diagram.

FIG. 4 illustrates an example method flow diagram of a method 400 to determine duplicative viewing data in viewing data reported by two or more video devices. The two or more video devices may be located at or otherwise associated with a household, such as the household 102b or 102c of FIG. 1. As an example, the method 400 may determine duplicative viewing data in viewing data reported by a set-top box (or other video data output device) and viewing data reported by a smart TV (or other video display device). Such duplicative viewing data may occur when the set-top box outputs video data (indicating video programming) to the smart TV and the smart TV displays the video programming. Since the set-top box reports viewing data based on the video data output by the set-top box and the smart TV reports viewing data based on the programming (indicated by the video data) displayed on the smart TV, this viewing activity may be doubly reported in the viewing data associated with the household.

At step 402, viewing data (e.g., the viewing data 302 of FIG. 3) is received. The viewing data may comprise a first portion indicative of video programming associated with a first video device. The viewing data may comprise a second portion indicative of video programming associated with a second video device. The first portion of the viewing data may be reported by the first video device and the second portion of the viewing data may be reported by the second video device. The first and/or second video device may comprise a video data output device (e.g., a cable set-top box, an OTT box, or a network device) or a video display device (e.g., a smart TV). The first video device may comprise a video data output device and the second video device may comprise a video display device, but the disclosure is not so limited. For example, the first and second video devices may both comprise a video data output device or may both comprise a video display device. The first and/or second video device may be located at the household or may be located remote from the household, such as a network device at a stream video source. The first and second portions of the viewing data may comprise one or more of screen data, cable box data, OTT data, or network data (e.g., the screen data 310, OTT data 312, cable box data 314, or network data 316 of FIG. 3, respectively).

Additionally or alternatively, receiving the viewing data may comprise receiving viewing data that is indicative of video programming output by a video output device located at a household and receiving viewing data that is indicative of video programming displayed by a video display device located at the household. For example, the viewing data indicative of the video programming output by the video output device may comprise the OTT data 312, the cable box data 314, or the network data 316 of FIG. 3. The viewing data indicative of the video programming displayed by the video display device may comprise the screen data 310 of FIG. 3, for example.

The first and second portions of the viewing data may be associated, at least in part, with a common time period. For example, there may be an overlap between a time period associated with the first portion of the viewing data and a time period associated with the second portion of the viewing data. Additionally or alternatively, the respective time periods of the first and second portions of the viewing data may substantially coincide with one another (e.g., with respect to start and end times).

At step 404, one or more characteristics are determined (e.g., the characteristics 320 of FIG. 3). The one or more characteristics may be associated with the household, the first or second video device, the video programming indicated in the first and second portions, and/or the viewing data or portions thereof (e.g., video data indicative of video programming output by a video output device and/or video data indicative of video programming displayed by a video display device). An example characteristic may indicate whether the first and second video devices are a matched pair of devices (e.g., classified as matched devices), such as the first video device comprising a video data output device and the second video device comprising a video display device connected to the first video device to receive the video data output indicative of the video programming. An example characteristic may indicate a similarly score (e.g., the similarity score 550 of FIG. 5) between the first and second video devices.

An example characteristic may comprise one or more IP addresses associated with the first and/or second video device. For example, the one or more IP addresses may include an IP address of a video source of the video programming (e.g., a video stream source). For example, the one or more IP addresses may include an IP address of the first and/or second device. An example characteristic may comprise a video quality (e.g., a video quality classification) of the video programming associated with the first device and/or a video quality of the video programming associated with the second device. Such video qualities may comprise SD video, HD video, or Ultra HD video. An example characteristic may indicate whether the household is HD-dominant, SD-dominant, or Ultra HD-dominant. An example characteristic may indicate an input of the video programming (e.g., video data indicative of such video programming) to the first and/or second device, such as an SD-TV input, an HD-TV input, OTT input, or application input. An example characteristic may indicate the volume or density of the first portion and/or the second portion. For instance, this example characteristic may indicate a large number of holes or missing data points in the first portion and/or the second portion.

At step 406, the video programming associated with the first video device and the video programming associated with the second video device may be compared with one another. For example, such comparing may comprise determining the television networks (e.g., channel) of the video programming indicated in the first portion of the viewing data and the television networks of the video programming indicated in the second portion of the viewing data. The television networks indicated in the first portion of the viewing data may be compared to the television networks indicated in the second portion of the viewing data, such as to determine any coincidences or matches between the television networks and/or the degree to which the television networks coincide (e.g., with respect to time). For example, as noted above, there may be holes or missing data points (e.g., due to ACR challenges) in the viewing data, despite the fact that the first and second portions of viewing data may represent, at least in part, the same viewing activity. Comparing the video programming associated with the first video device and the video programming associated with the second video device may comprise determining that the number of televisions network matches and/or the degree to which the television networks coincide satisfy a respective threshold.

Comparing the video programming associated with the first video device and the video programming associated with the second video device may comprise comparing a first time period (e.g., an output or display time, as appropriate) associated with the first video programming and a second time period (e.g., an output or display time, as appropriate) associated with the second video programming. For example, comparing the first time period and the second time period may comprise determining whether the first and second time periods overlap one another and/or which particular portions of the first and second time periods overlap with one another. Comparing the video programming associated with the first video device and the video programming associated with the second video device may comprise comparing a first video asset (e.g., show or movie) associated with the video programming associated with the first video device with a second video asset (e.g., show or movie) associated with the video programming associated with the second video device. For example, comparing the first video asset with the second video asset may comprise determining whether the first video asset and the second video asset are the same or different.

At step 408, it may be determined that the first portion of the viewing data is duplicative, at least in part, with the second portion of the viewing data. Such determination may be based on the one or more characteristics associated with the first and second portions of the viewing data and/or the comparison of the video programming associated with the first video device and the video programming associated with the second video device. For example, determining that the first portion of the viewing data is duplicative, at least in part, with the second portion of the viewing data may be based on a determined likelihood (e.g., the likelihood metric 322 of FIG. 3) that the first portion is duplicative with the second portion and/or a determined confidence (e.g., the confidence metric 324) associated with the determining that the first portion is duplicative with the second portion. The likelihood and/or confidence may be based on the characteristic(s) associated with the first and second portions of the viewing data and/or the comparison of the video programming associated with the first video device and the video programming associated with the second video device.

Determining that the first portion of the viewing data is duplicative with the second portion of the viewing data may be based on the likelihood and/or confidence satisfying respective likelihood and/or confidence thresholds. For example, unless the first portion could be determined as duplicative with the second portion at a confidence level that satisfies the confidence threshold, the first portion may not be deemed, or otherwise treated, as being duplicative with the second portion. In this hypothetical case, for example, the first portion may continue to be included in the viewing data, such as for purposes of viewership analysis. Similarly, determining that the first portion of the viewing data is duplicative with the second portion may be conditional upon there being a sufficient likelihood, given the known characteristics associated with the first and second portions, that the first portion is indeed duplicative with the second portion. In this sense, determining that the first portion of the viewing data is duplicative with the second portion may comprise classifying the first portion as duplicative with the second portion for purposes of including or excluding the first portion from subsequent viewership analysis.

Determining that the first portion of the viewing data is duplicative with the second portion may be additionally or alternatively based on a comparison, with respect to time and/or video programming, of the first portion and the second portion of the video data. For example, such determination may be based on the degree of temporal overlap between the first portion and the second portion. As another example, such determination may be based on the commonality of the video programming associated with the first video device and the video programming associated with the second video device. Such commonality may be with respect to the television network(s) (e.g., channel(s)) associated with the video programming or the video programming itself (e.g., a video asset, such as a show or movie). For example, the television networks indicated in the first portion of the viewing data may be compared with the television networks indicated in the second portion of the viewing data. If the television networks indicated in the first portion of the viewing data sufficiently align with the television networks indicated in the second portion of the viewing data, this may tend to indicate that the first portion is duplicative with the second portion.

As noted, the duplicative viewing data in the first portion of the viewing data may be excluded (e.g., filtered out or disregarded) from the viewing data. For example, the duplicative viewing data may be excluded prior to using the viewing data in a viewership analysis.

FIG. 5 illustrates an example data flow diagram 500 for, at the least, determining one or more pairs of matched devices 552 at a common household (e.g., the households 102b, 102c in FIG. 1). A truncation model 554 and one or more scaling factors 556 may be determined based on the matched devices 552. The truncation model 554 and/or the scaling factors 556 may be used to determine viewing data of a training data set for determining a model (e.g., the model 632 of FIGS. 6A and 6B or the hybrid model 738 or STB model 740 of FIG. 7A). In addition, determining that a pair of video devices constitute a matched pair may be a useful tool in determining duplicative viewing data (e.g., the duplicative viewing data 326 of FIG. 3) in the viewing data reported by the pair of video devices (e.g., the cable box data 314 and screen data 310 of FIG. 3).

Aspects of the data flow diagram 500 may be performed as part of a prior analysis (with respect to the viewing time periods captured in the smart TV household data and STB household data) of viewing data reported by common homes, although the disclosure is not so limited. A matched pair may refer to a set-top box and smart TV pair in which the set-top box outputs video programming to the smart TV and the smart TV displays at least a portion of such video programming. Although referred to as a "pair," the disclosure is not so limited and a set of matched devices may comprise more than two devices.

The matched devices 552 at a common household may be determined based on a similarity score 550 associated with a set-top box and smart TV pair at the common household. The similarity score 550 may indicate a matching relationship (or lack thereof) between the pair. The similarity score 550 may be based on STB data 512 reported for the common household and screen data 514 reported for the common household. The STB data 512 may indicate video programming output by the set-top box of the pair, as well as video programming output by any other reporting set-top boxes at the common household. The screen data 514 may indicate video programming displayed by the smart TV of the pair, as well as video programming displayed by any other reporting smart TVs at the common household.

The similarity score 550 may be determined based on a comparison of the video programming reported in the STB data 512 and the video programming reported in the screen data 514. The comparison may be performed on a time period-by-time period basis, such as an hourly basis. The comparison may be with respect to the television/cable network associated with the video programming. For example, the networks indicated in the STB data 512 for a particular hour may be compared to the networks indicated in the screen data 514. The number of common networks during the hour may be determined, as well as the total number of networks (e.g., different networks) for the hour indicated in the STB data 512 and the total number of networks (e.g., different networks) for the hour indicated in the screen data 514. The similarity score 550 may be determined based on the number of common networks during the hour (or other length of time), the total number of networks for the hour indicated in the STB data 512, and the total number of networks for the hour indicated in the screen data 514. The similarity score 550 may be determined according to Eq. (1) below.

$$\text{Similarity Score} = \frac{\text{matched count} * 2}{\text{STB data total count} + \text{screen data total count}} * 100 \quad \text{Eq. (1)}$$

"Matched count" in Eq. (1) may comprise the number of common networks indicated in both the STB data 512 and the screen data 514 during the time period. "STB data total count" may comprise the total number of networks for the time period indicated in the STB data 512 and "screen data total count" may comprise the total number of networks for the time period indicated in the screen data 514. The similarity score 550 may be regarded as a weighted percentage of networks watched that match between the STB data 512 and the screen data 514.

The matched devices 552 for the common household (if any) may be determined based on the similarity score 550. The matched devices 552 may be determined based on the similarity score 550 satisfying (e.g., exceeding) a threshold value. The matched devices 552 may also be determined based on identifying a common IP address associated with the matched devices 552. The matched devices 552 may also be determined based on the manufacturer specific signal to and/or from a remote control that is used to control the smart TV and/or set-top box.

Figure 6A:
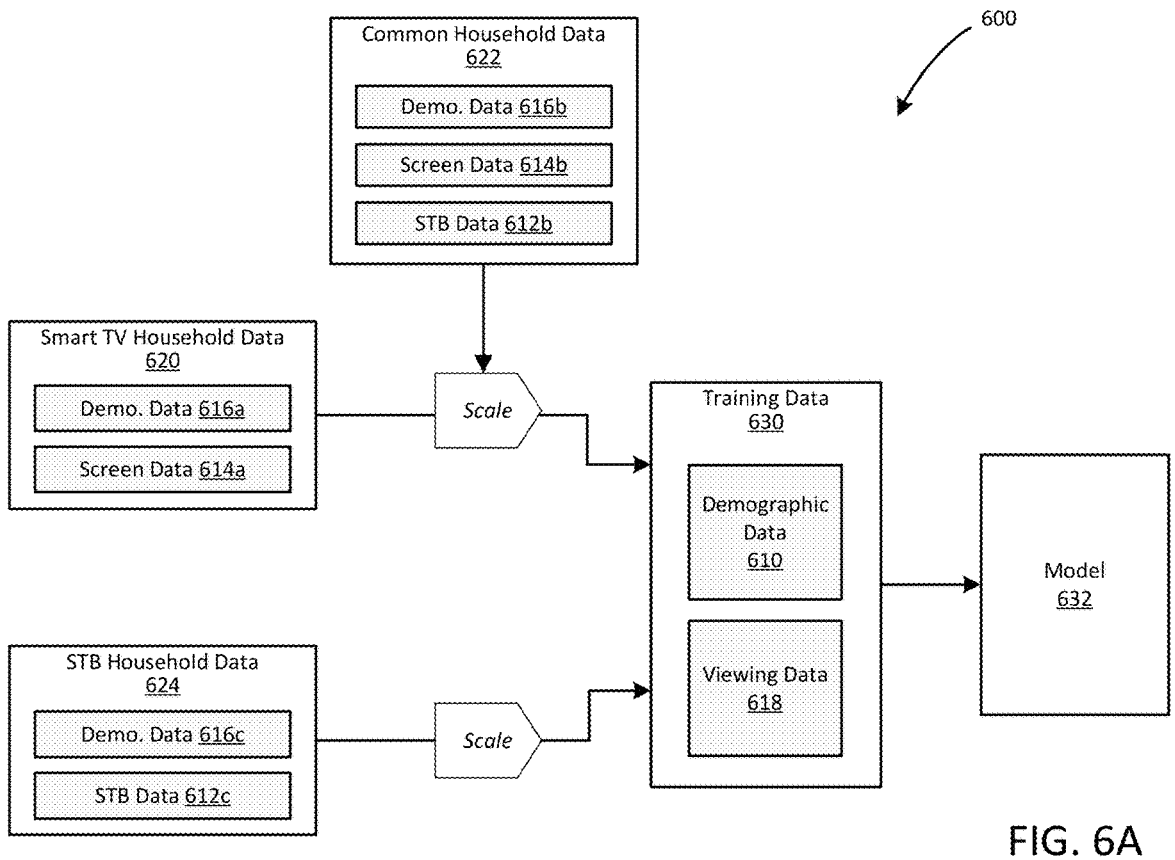
FIG. 6A illustrates an example data flow diagram.
Figure 6B:
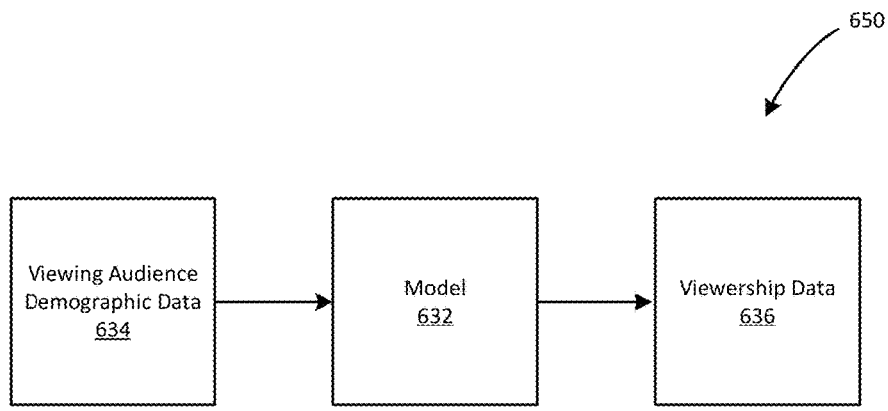
FIG. 6B illustrates an example data flow diagram.
Figure 7A:
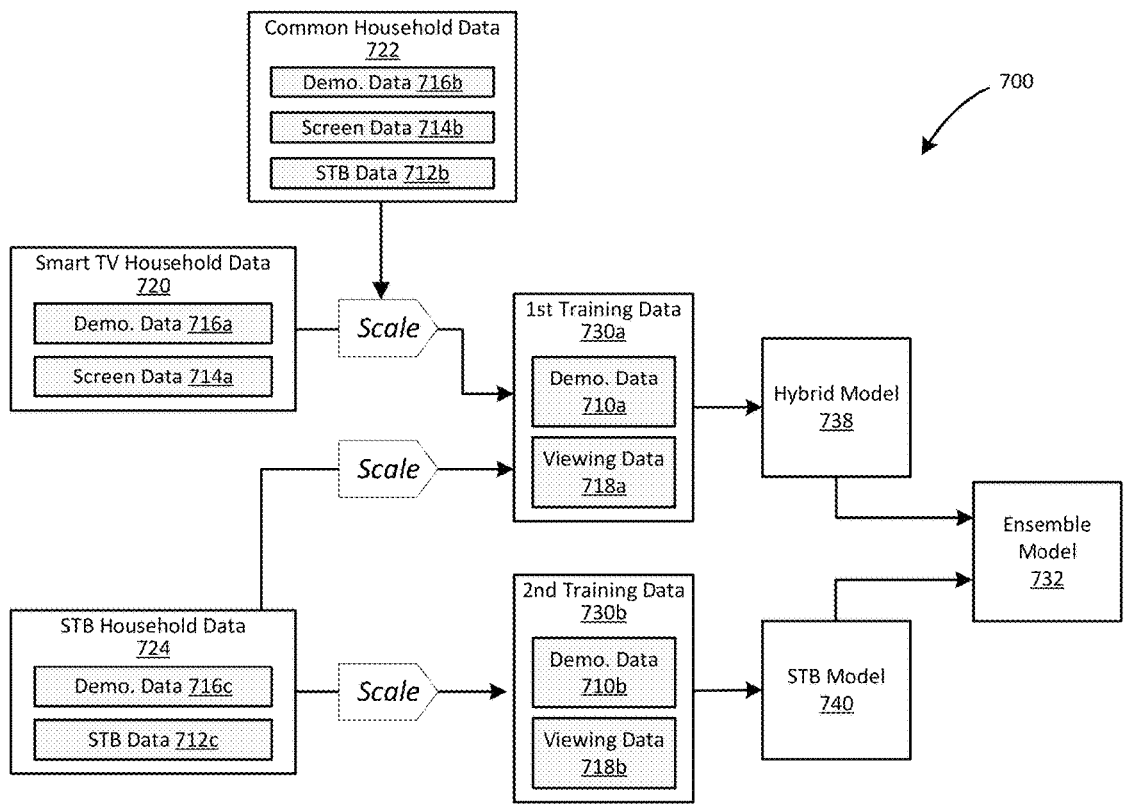
FIG. 7A illustrates an example data flow diagram.

Identifying matched devices in common households may be used in determining the model 632 of FIGS. 6A and 6B and/or the hybrid model 738 of FIG. 7A. For example, a portion of the viewing data 618 of FIG. 6A or the viewing data 718a of FIG. 7A associated with matched devices may be filtered, scaled, weighted, or disregarded to account for the matched devices. Determining matched devices at common households may be used to identify any duplicative viewing data represented in the viewing data 618, 718a, which may be filtered, scaled, weighted, or disregarded accordingly.

The matched devices 552 and associated viewing data (together with identified matched devices and associated viewing data for various other common households) may be used to determine the truncation model 554 and the scaling factors 556. The truncation model 554 may be configured to minimize the effect caused by viewing activity indicated in viewing data that did not, in fact, occur. For example, a set-top box may remain turned on while the corresponding TV is turned off. Yet the unwatched video programming output by the set-top box may be incorrectly indicated in the viewing data reported by the set-top box. As another example, a smart TV may have been left on while no one is present to view the displayed video programming. The viewing data reported by the smart TV may incorrectly indicate viewing activity for this time period. As noted, the truncation model 554 may be used to determine the model 632 of FIGS. 6A and 6B or the hybrid model 738 or STB model 740 of FIG. 7A. For example, the truncation model 554 may be applied to the viewing data 618 of FIG. 6A and/or the viewing data 718a, b of FIG. 7A to filter or disregard portion(s) of said viewing data. The truncation model 554 may be applied to filter or disregard portion(s) of reported viewing data that is determined to incorrectly indicate viewing activity that did not actually occur. The truncation model 554 may be used to identify and filter or disregard duplicative viewing activity represented in reported viewing data.

The truncation model 554 and/or the scaling factors 556 may be determined based on further analysis of the portions of the STB data 512 and screen data 514 that are associated with the matched devices 552. For example, the truncation model 554 may be determined by identifying a viewing session for the matched devices 552 that is represented, at least in part, in the STB data 512 and screen data 514 and comparing the start and end times of the viewing session indicated in the STB data 512 with the respective start and end times of the viewing session indicated in the screen data 514. For instance, it may be determined that the start times generally correspond with one another, but the end time reflected in the STB data 512 is later than the end time reflected in the screen data 514. This difference in reported end times may be a basis, at least in part, for determining the truncation model 554. Similar analysis may be performed with respect to other viewing sessions identified in the STB data 512 and screen data 514 and with respect to viewing sessions identified in STB and screen data for other common households. Such analysis may provide additional bases for determining the truncation model 554.

The scaling factors 556 may be determined by grouping the common households according to the number of set-top boxes at each common household. The relative proportions for the groups (with respect to the body of common homes at large) may be compared to analogous STB-per-household groupings and proportions of a sample of STB households to determine the scaling factors 556. The scaling factors 556 may be applied to the screen data 614a to determine, at least in part, the viewing data 618 in FIG. 6A. The scaling factors 556 may be similarly applied to the screen data 714a to determine, at least in part, the viewing data 718a of FIG. 7A. The scaling factors 556 may be applied to viewing data to normalize the viewing data with other reported viewing data and/or to make the viewing data better representative of all viewing in the associated household. For example, a smart TV household may often have only a single reporting smart TV while a set-top box household may typically have multiple reporting set-top boxes. The viewing data from the smart TVs of the smart TV households may be scaled up to better match the volume of viewing data collected from the set-top boxes of the set-top box households.

FIGS. 6A and 6B illustrate an example data flow diagram 600 and an associated example data flow diagram 650, respectively. In the data flow diagram 600 of FIG. 6A, a model 632 may be determined based on training data 630 comprising demographic data 610 and viewing data 618. The training data 630 may be determined based on smart TV household data 620 and STB (set-top box) household data 624. The smart TV household data 620 and STB household data 624 may be scaled to normalize the reported viewing data and/or to best represent all viewing in a household. The smart TV household data 620 may be scaled based on common household data 622. The model 632 may be determined via machine learning techniques, such as decision tree learning. In the data flow diagram 650 of FIG. 6B, viewership data 636 for a viewing audience may be determined based on the model 632 and viewing audience demographic data 634 for the viewing audience. For example, the viewing audience demographic data 634 may be input to the model 632 to determine the viewership data 636. The viewing audience demographic data 634 and the viewership data 636 may cover a viewing audience that is different than (e.g., larger than), at least in part, the viewing audience represented in reported viewing data (e.g., STB data and/or screen data). For example, the reporting viewing audience may comprise a sub-population or sample of a larger viewing audience (e.g., a national or regional viewing audience) associated with the viewing audience demographic data 634 and the viewership data 636.

The smart TV household data 620 may be associated with one or more households (e.g., households 102 in FIG. 1) that report screen data but do not report STB data. Such households may have one or more reporting smart TVs but no reporting set-top boxes. A household that reports screen data but does not report STB data may be referred to herein as a "smart TV household". The household 102d in FIG. 1 may be an example of a smart TV household. The smart TV household data 620 may comprise screen data 614a and demographic data 616a.

The screen data 614a (as well as the screen data 614b) may be the same as or similar to, in at least some aspects, the screen data 114 in FIG. 1 and/or the screen data 214 in FIG. 2, as they are discussed in a generic sense. The demographic data 616a (as well as the demographic data 616b and the demographic data 616c) may be the same as or similar to, in at least some aspects, the demographic data 216 in FIG. 2, as it is discussed in a generic sense.

The screen data 614a may comprise the aggregated screen data reported by the smart TV households. The screen data 614a may represent, at least in part, viewing activity at the smart TV households that is captured by one or more smart TVs at the respective smart TV households. The one or more smart TVs may determine the screen data 614a based on video programming displayed by the respective smart TVs, such as via automatic content recognition. The screen data 614a may indicate the video programming displayed by smart TVs at respective smart TV households. The screen data 614a may be indexed or otherwise organized by household. The demographic data 616a may comprise sets of demographic data for the respective smart TV households. The demographic data 616a may be indexed or otherwise organized by household, in a similar manner as the screen data 614a. As such, the demographic data 616a and the screen data 614a for a given smart TV household may be associated (e.g., correlated or matched) with one another.

The STB household data 624 may be associated with one or more households that report STB data but do not report screen data. Such a household may be referred to herein as an "STB household." An STB household may have one or more reporting set-top boxes but no reporting smart TVs, although the disclosure is not so limited. The household 102a in FIG. 1 provides an example of an STB household. The STB household data 624 may comprise STB data 612c and demographic data 616c.

The STB data 612c may comprise aggregated STB data reported by the STB households. The STB data 612c may be based on, and indicate, video programming output by one or more set-top boxes at the respective STB households. The STB data 612c may reflect viewing activity at the STB households that is captured by one or more set-top boxes at the respective STB households. The STB data 612c may be indexed or otherwise organized by household. The demographic data 616c may comprise sets of demographic data for the respective STB households. The demographic data 616c may be indexed or otherwise organized by household, in a similar manner as the STB data 612c. As such, the demographic data 616c and the STB data 612c for a given STB household may be associated (e.g., correlated or matched) with one another.

The common household data 622 may be associated with one or more households that report both screen data and STB data. A household that reports both screen data and STB data may be referred to herein as a "common household". The households 102b and 102c in FIG. 1 may be examples of common households. The common household data 622 may comprise STB data 612b, screen data 614b, and demographic data 616b. The STB data 612b (as well as the STB data 612c) may be the same as or similar to, in at least some aspects, the STB data 112 in FIG. 1 and/or the STB data 212 in FIG. 2, as they are discussed in a generic sense. The common household data 622 or other similar common household data may provide a useful source of information to examine reporting differences (e.g., between STB data and screen data) in the same household. The common household data 622 may be additionally or alternatively used as part of the training data 630 to determine the model 632.

The STB data 612b may comprise the aggregated STB data reported by the common households. The STB data 612b may indicate video programming output by one or more set-top boxes at the respective common households. The STB data 612b may represent, at least in part, viewing activity at the common households that is associated with one or more set-top boxes at the respective common households. The screen data 614b may comprise the aggregated screen data reported by the common households. The screen data 614b may be based on, and indicate, video programming displayed on one or more smart TVs at the respective common households. The screen data 614b may represent, at least in part, viewing activity at the common households that is captured by one or more smart TVs at the respective common households. The demographic data 616b may comprise sets of demographic data for the respective common households. The STB data 612b, the screen data 614b, and the demographic data 616b may be each indexed or otherwise organized by household. As such, the demographic data 616b, STB data 612b, and the screen data 614b for a given common household may be associated (e.g., correlated or matched) with one another.

In some cases, there may be full overlap (e.g., significantly full overlap) between the screen data 614b for a common household and the STB data 612b for the common household. That is, all (e.g., significantly all) reported viewing activity for a common household may be reflected in both the STB data 612b and the screen data 614b for the common household. An example common household (not shown in FIG. 1) that may potentially report fully-overlapping STB data 612b and screen data 614b may be one with a single set-top box that outputs video programming to a single smart TV. This is also assuming that the smart TV does not display and report video programming other than that output by the set-top box.

In other cases, there may be no overlap (e.g., no significant overlap) between the screen data 614b for a common household and the STB data 612b for the common household. That is, there may be no viewing activity (e.g., no significant viewing activity) reflected in the screen data 614b for the common household that is also reflected in the STB data 612b, and vice versa. The viewing activity reflected in the screen data 614b for the common household may be independent (e.g., significantly independent) of the viewing activity reflected in the STB data 612b for the common household. The household 102b in FIG. 1 shows one possible example that may theoretically result in no overlap (e.g., no significant overlap) between the STB data 612b and the screen data 614b. There, the smart TV 106b does not receive video programming from the set-top box 108b and the set-top box 108b does not output video programming to the smart TV 106b. Although, as noted, it may not be known, at least for purposes of viewership analysis, that the set-top box 108b is in fact paired with the television 104b and the smart TV 106b is in fact paired with the network device 110b. That is, it may not actually be known that the STB data 112b and the screen data 114b are independent of each other. In this instance, for example, there may be no distinction for purposes of viewership analysis between the STB data 112b and screen data 114b associated with the (common) household 102b and the STB data 112c and screen data 114c associated with the (common) household 102c.

In yet other cases, there may be at least partial overlap (e.g., significant partial overlap)—but not full overlap—between the STB data 612b for a common household and the screen data 614b for the common household. That is, at least a portion (e.g., at least a significant portion) of the reported viewing activity reflected in the STB data 612b for a common household may be also reflected in the screen data 614b for the common household, and vice versa. With respect to common households, partial overlap may be a more common occurrence than no overlap or full overlap.

The household 102c in FIG. 1 is an example common household in which partial (but not full) overlap may potentially occur. For example, viewing activity captured by the first set-top box 108c and reflected in the STB data 112c may not be reflected in the screen data 114c because the smart TV 106c does not receive video programming from the first set-top box 108c. As another example, the smart TV 106c may be turned off (and thus not capturing viewing activity) while the second set-top box 108cc continues to output video programming, which may be reported (albeit incorrectly) as viewing activity by the second set-top box 108cc in the STB data 112c. As yet another example, the smart TV 106c may display video programming from a video input other than the second set-top box 108cc, such as an over-the-air broadcast or a video input from a digital media player. In this example, the smart TV 106c may report this viewing activity but the second set-top box 108cc may not. As another example, the set-top box 108cc may output video data to another display device (not shown) besides the smart TV 106c. Truncation techniques may be used to account, at least in part, for this and similar scenarios in viewing data analysis. For instance, the STB data 112c from the set-top box 108cc and the screen data 114c from the smart TV 106c may include some duplicative viewing data indicating the same viewing activity. The duplicative viewing data may be determined by identifying the set-top box 108cc and the smart TV 106c as a matched pair. The duplicative viewing data in either of the STB data 112 or screen data 114c may be excluded from viewing data analysis, such as determining the model 632.

Demographic attributes indicated in the demographic data 616a, 616b, 616c and the demographic data 610 may include, on a per-household basis, one or more of age, presence of women, presence of men, presence of children, entertainment spend, home ownership, income, education, ethnicity, language, occupation, property type, rural or urban setting, length of residency, media market, number of video data output devices, number of video display devices, and person count.

The demographic data 610 of the training data 630 may be based on one or more of the demographic data 616a, 616c. The demographic data 610 may be further based on the demographic data 616b. The demographic data 610 may comprise an aggregate of one or more of the demographic data 616a, 616c. The demographic data 610 may further comprise the demographic data 616b. The demographic data 610 may comprise sets of demographic data for the respective households associated with one or more of the smart TV household data 620 and the STB household data 624 (and/or the common household data 622). In a similar manner as the demographic data 616a, 616b, 616c, the demographic data 610 may be indexed or otherwise organized by household. A given household represented in the demographic data 610 may be associated with at least a portion of the demographic data 610 that corresponds with that household.

The viewing data 618 of the training data 630 may be based on one or more of the screen data 614a of the smart TV household data 620 and the STB data 612c of the STB household data 624. The viewing data 618 may be further based on the screen data 614b and the STB data 612b of the common household data 622. The viewing data 618 may comprise an aggregate of the screen data 614a and the STB data 612c. The viewing data 618 may further comprise the screen data 614b and the STB data 612b of the common household data 622. In a similar manner as the screen data 614a, 614b and the STB data 612b, 612c, the viewing data 618 may be indexed or otherwise organized according to household. The viewing data 618 (and the smart TV household data 620, common household data 622, and STB household data 624 likewise) may be associated with a particular time window or cross-section of viewing activity. The time window or cross-section of viewing activity associated with the common household data 622 may be different than (e.g., prior to) that associated with the smart TV household data 620 and the STB household data 624. In other instances, the time window or cross-section of viewing activity associated with the common household data 622 may be additionally or alternatively the same as that associated with the smart TV household data 620 and the STB household data 624.

The viewing data 618 may be determined by scaling one or more of the screen data 614a and the STB data 612b. Scaling one of more of the screen data 312a and the STB data 612b may be done to normalize the viewing data for the statistical analysis involved in determining the model 632. For example, the ratio of reporting devices to non-reporting devices varies amongst the sampled smart TV, STB, and common households. This may be so even across a set of households with the same number of total display devices. To illustrate, among an example set of set-top box households, each may have a total of four display devices, but some may have one reporting set-top box, some may have two reporting set-top boxes, and so forth. The viewing data that is reported may be scaled to account for these differences and to make the reported viewing data more representative of all viewing in a home. For example, the reported viewing data from the households with one reporting set-top box may be scaled up so that this viewing data is normalized with the reported viewing data from the set-top box households with two, three, or four reporting set-top boxes. Such scaling may be additionally or alternatively performed based on the type of reporting device (set-top box or smart TV). For example, viewing data from smart TV households may be scaled up to be normalized with viewing data from set-top box households.

Scaling the screen data 614a and/or the STB data 612c may be based on the common household data 622. The various scaling factors or other parameters for scaling may be based on analysis of the screen data 614b and the STB data 612b of the common household data 622. Such analysis may be a prior analysis, i.e., prior with respect to the screen data 614a of the smart TV household data 620 and/or the STB data 612c of the STB household data 624. If represented in the viewing data 618, the screen data 614b and the STB data 612b of the common household data 622 may be scaled to determine the viewing data 618.

Scaling may be performed according to the type of household (e.g., smart TV household or STB household) and on a household-by-household basis within a household type. For a particular household type, the screen data and/or set-top box data from those households may be scaled according to a common formula, algorithm, or methodology. Scaling with respect to a particular household may be performed based on an attribute or variable associated with that household. For example, scaling may be performed based on a number of a particular type of device at or attributed to a household, such as the number of set-top boxes at or attributed to a household.

The screen data 614a of the smart TV household data 620 may be scaled based on the common household data 622, such as based on a prior analysis of the common household data 622. The smart TV household data 620 may be associated with a first viewing time period and at least a portion of the common household data 622 may be associated with a prior, second viewing time period. The STB data 612b and screen data 614b of the common household data 622 may comprise, at least in part, viewing data that is not represented in the viewing data 618 of the training data 630. In some instances, the STB data 612b and the screen data 614b may additionally or alternatively comprise, at least in part, viewing data that is represented in the viewing data 618. The scaling factors and other parameters may be determined based on viewing data in the STB data 612b and screen data 614b that is associated with television networks that are common to both the STB data 612b and the screen data 614b.

In many instances, smart TV households may contain only one reporting smart TV, even if additional, non-reporting TVs (smart or otherwise) are found in the household. Conversely, STB households may often contain multiple reporting set-top boxes. To compensate for this disparity in reporting, the screen data 614a of the smart TV household data 620 may be scaled (e.g., normalized with respect to the STB data 612c) so that it is better representative of overall viewing in the smart TV households. For example, the screen data 614a associated with each smart TV household may be scaled according to a set scaling factor that is the same for each smart TV household. Scaling the screen data 614a may comprise scaling up the screen data 614a.

In another example for scaling screen data, the screen data 614a may be scaled according to a variable scaling factor. For instance, the screen data 614a for each smart TV household may be scaled according to a variable scaling factor selected from a set of scaling factors. The particular scaling factor for a household from the set of scaling factors may be based on a number (hypothetical or actual) of set-top boxes attributed to the household. The set of scaling factors may be non-linear in progression. For example, a first scaling factor may be 1.5, a second scaling factor may be 2.0, a third scaling factor may be 3.0, and a fourth scaling factor may be 5.0. The set of scaling factors may be pre-determined. The set of scaling factors may be determined based on a sample of STB households (not necessarily those associated with the STB household data 624) and the number of set-top boxes (e.g., reporting set-top boxes) in each STB household of the sample. The proportions of STB households (e.g., marginals) in the sample may be determined according to the number of set-top boxes at the respective STB households (e.g., the proportion of STB households with one set-top box, the proportion of STB households with two set-top boxes, etc.). Such proportions or marginals associated with the sample STB households may be compared to analogous STB-per-household proportions or marginals associated with the common households to determine the set of variable scaling factors for scaling the screen data 614*a*. For example, it may be determined that the STB-per-household proportions for the STB household sample are substantially the same as the STB-per-household proportions for the common households. The scaling factor associated with any given number of set-top boxes may be determined by comparing (e.g., dividing by) the sample STB household viewing data associated with this number of set-to boxes to the common household viewing data associated with this number of set-top boxes.

The variable scaling factor applied to screen data may be based on the number (hypothetical or actual) of set-top boxes attributed to the household. For example, screen data for households with one attributed set-top box may be scaled by a first scaling factor from the set of scaling factors. Screen data for households with two attributed set-top boxes may be scaled by a second scaling factor from the set of scaling factors, and so forth. For a smart TV household, since such household is understood to have no reporting set-top boxes (or no set-top boxes at all), screen data for the smart TV household may be scaled based on a randomly-determined hypothetical number of set-top boxes attributed to the smart TV household. The randomly-determined hypothetical number may be within a pre-defined range, such as one through four. The number of hypothetical set-top boxes attributed to a smart TV household may be based on other features of a smart TV household that correlate to the number of set-top boxes at a smart tv household. For example, certain demographic characteristics may correlate with the number of set-top boxes at a household. Thus, the number of hypothetical set-top boxes attributed to a smart TV household may be based on demographic data associated with the smart TV household. For other types of households, such as where common household data 622 is included in the viewing data 618, screen data (e.g., the screen data 614*b*) may be scaled based on the actual number of set-top boxes at the household.

STB data (e.g., the STB data 612*c*) for a household may be scaled based on the number of set-top boxes at the household, such as the number of reporting set-top boxes at the household. STB data for a household may be scaled based on an expected total number of set-top boxes at the household, including both reporting and non-reporting set-top boxes. STB data may be scaled to account for possible (e.g., expected) set-top boxes at the household that do not report STB data. For example, a household with one reporting set-top box may be expected to have several non-reporting set-top boxes and the scaling may be performed accordingly. This scaling may be performed regardless of whether a household actually has any non-reporting set-top boxes or not. Where common household data 622 is represented in the viewing data 618, STB data for a common household may be scaled differently than STB data for an STB household. For example, STB data from common households may not be scaled while STB data from STB households may be scaled based on the number of set-top boxes (e.g., reporting) at the respective STB households. A common scaling factor may be applied to STB data for all household with one or more (e.g., only one) reporting set-top box.

Truncation techniques may also be applied to the screen data 614*a* and/or the STB data 612*c* to determine the viewing data 618. Truncation techniques may also be applied to the viewing data 618 itself. The truncation techniques may be based on the common household data 622. For example, the truncation techniques may be based on identifying a matched set-top box and smart TV pair at a common household and analyzing the viewing data reporting by each. Truncation may comprise filtering or disregarding portions of viewing data in the screen data 614*a* and/or the STB data 612*c*. Truncation may aim to compensate for viewing activity that is indicated in reported viewing data but which did not in fact occur. Truncation may further aim to compensate for duplicative viewing data. For example, truncation may additionally or alternatively comprise filtering or disregarding portions of viewing data in the screen data 614*b* that is duplicative of portions of viewing data in the STB data 612*b* or vice versa.

A household represented in the training data 630 may be associated with at least a portion of the demographic data 610 corresponding to the household and at least a portion of the viewing data 618 corresponding to the household. The training data 630 may comprise one or more data sets, each indicating a household, associated viewing data, and associated demographic data. The households associated with the smart TV household data 620 and the STB household data 624 may be associated with such respective data sets.

Machine learning techniques may be applied to the training data 630 to determine the model 632. A supervised machine learning technique may be used to determine the model 632, such as decision tree learning. In a supervised machine learning process, the demographic data 616*a*, 616*b*, 616*c* may be regarded as the input object (e.g., feature vector) and the screen data 614*a*, 614*b* and STB data 612*b*, 612*c* may be regarded as the output value(s). In decision tree learning, tree size(s) may be optimized. Gradient boosting algorithms may be used in the decision tree learning, such as XGBoost algorithms. The model 632 may be considered a hybrid model since it is based on screen data from smart TV households and STB data from STB households. As shown in FIG. 7A, ensemble methods may be used to determine the model 632.

In the data flow diagram 650, the viewership data 636 may be determined based on the model 632 and the viewing audience demographic data 634. For example, the viewing audience demographic data 634 may be provided as input to the model 632 and the viewership data 636 may comprise the output of the model 632. With respect to form and types of demographic attributes, the viewing audience demographic data 634 may be the same as or similar to, in at least some aspects, the demographic data 610 of the training data 630. Yet the viewing audience demographic data 634 may represent a different (e.g., larger) viewing audience than that represented in the demographic data 610 of the training data 630, although there may be some overlap. As reporting households may make up only a portion of a viewing audience, the viewing audience demographic data 634 may cover additional households within the viewing audience. The viewing audience represented in the demographic data 610 of the training data 630 may be regarded as a sub-population or sample of a larger viewing audience represented in the viewing audience demographic data 634. For example, the demographic data 610 may represent a portion of the viewing audience within a media market and the viewing audience demographic data 634 may represent the viewing audience within the media market as a whole. As another example, the demographic data 610 may represent of portion of a national viewing audience and the viewing audience demographic data 634 may represent the national viewing audience.

The viewing audience demographic data 634 input to the model 632 may be filtered according to one or more demographic data attributes, such as those defining an audience segment. For example, the portion of the viewing audience demographic data 634 input to the model 632 may be limited to demographic data for households in which at least one male between the ages of 18 and 35 resides. The viewing audience demographic data 634 may be filtered according to geographic region or media market. The resulting viewership data 636 may likewise comprise viewership data for the defined audience segment (e.g., a rolled-up audience segment).

The viewership data 636 may comprise viewership metrics (e.g., ratings) for the viewing audience associated with the viewing audience demographic data 634. The viewership data 636 may comprise projected future viewing activity or projected future viewership metrics for the viewing audience. The viewership data 636 may be associated with a particular television/cable network or channel. The viewership data 636 may be associated with particular video programming. The viewership data 636 may be associated with a particular broadcast of video programming. The viewership data 636 may be associated with a particular repeating video programming series, such as a nightly news program or a situational comedy program that is broadcast weekly. The viewership data 636 may be associated with a particular episode or other subdivision of a repeating video program series. The viewership data 636 may indicate a probability that a household views particular video programming (e.g., a television/cable network or channel) and for how long.

Figure 7B:
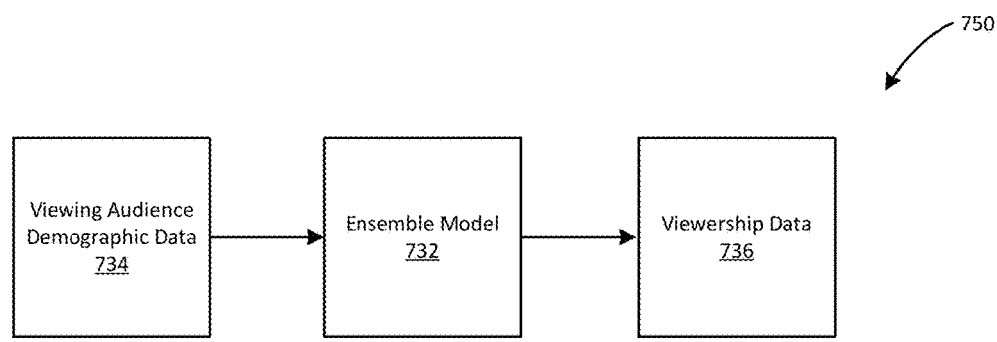
FIG. 7B illustrates an example data flow diagram.

FIGS. 7A and 7B illustrate an example data flow diagram 700 and an associated example data flow diagram 750, respectively. Some aspects of the data flow diagram 700 may be the same as or similar to some aspects of the data flow diagram 600 in FIG. 6A. Likewise, some aspects of the data flow diagram 750 may be the same as or similar to some aspects of the data flow diagram 650 in FIG. 6B. In the data flow diagram 700 of FIG. 7A, a hybrid model 738 may be determined based on first training data 730a comprising demographic data 710a and viewing data 718a. The first training data 730a may be determined based on smart TV household data 720 and STB household data 724, one or more of which may be scaled. For example, the smart TV household data 720 may be scaled based on common household data 722. An STB model 740 may be determined based on second training data 730b comprising demographic data 710b and viewing data 718b. The second training data 730b may be determined based on the STB household data 724, which may be scaled. The hybrid model 738 and the STB model 740 may be determined via machine learning techniques, such as decision tree learning. An ensemble model 732 may be determined, via ensemble learning techniques, based on the hybrid model 738 and the STB model 740. In the data flow diagram 750 of FIG. 7B, viewership data 736 for a viewing audience may be determined based on the ensemble model 732 and viewing audience demographic data 734 for the viewing audience. The viewing audience represented in the viewing audience demographic data 734 and viewership data 736 may comprise a different (e.g., larger) viewing audience than the reporting viewing audience and/or the reporting viewing audience may comprise a sub-population or sample within a larger viewing audience.

The smart TV household data 720 may be associated with one or more reporting smart TV households. The smart TV household data 720 may comprise screen data 714a and demographic data 716a. The smart TV household data 720, the screen data 714a, and the demographic data 716a may be the same as or similar to the smart TV household data 620, the screen data 614a, and the demographic data 616a in FIG. 6A, respectively.

The screen data 714a may comprise the aggregated screen data reported by the smart TV households. The screen data 714a may reflect viewing activity at the smart TV households that is captured by one or more smart TVs at the respective smart TV households. The one or more smart TVs may determine the viewing activity based on video programming displayed by the respective smart TVs, such as via automatic content recognition. The demographic data 716a may comprise demographic data associated with the smart TV households represented in the smart TV household data 720.

The STB household data 724 may be associated with one or more STB households. The STB household data 724 may comprise STB data 712c and demographic data 716c. The STB household data 724, STB data 712c, and demographic data 716c may be same as or similar to, in at least some aspects, the STB household data 624, STB data 612c, and demographic data 616c in FIG. 6A, respectively.

The STB data 712c may comprise the aggregated STB data reported by the STB households. The STB data 712c may be based on video programming output by one or more set-top boxes at the respective STB households. The STB data 712c may reflect, at least in part, viewing activity at the STB households that is captured by one or more set-top boxes at the respective STB households. The demographic data 716c may comprise demographic data associated with the STB households represented in the STB household data 724.

The common household data 722 may be associated with one or more common households. The common household data 722 may comprise STB data 712b, screen data 714b, and demographic data 716b. The common household data 722, STB data 712b, screen data 714b, and demographic data 716b may be the same as or similar to, in at least some aspects, the common household data 622, STB data 612b, screen data 614b, and demographic data 616b in FIG. 6A, respectively.

The STB data 712b may comprise the aggregated STB data reported by the common households. The STB data 712b may be based on video programming output by one or more set-top boxes at the respective common households. The STB data 712b may reflect, at least in part, viewing activity at the common households that is captured by one or more set-top boxes at the respective common households. The screen data 714b may comprise the aggregated screen data reported by the common households. The screen data 714b may be based on video programming displayed on one or more smart TVs at the respective common households. The screen data 714b may reflect, at least in part, viewing activity at the common households that is captured by one or more smart TVs at the respective common households. The demographic data 716b may comprise demographic data associated with the common households represented in the common household data 722.

The demographic data 710a of the first training data 730a may be based on the demographic data 716a, 716c. In some instances, the demographic data 710a may be further based on the demographic data 716b. The demographic data 710a may be the same as or similar to, in at least some aspects, the demographic data 610 of the training data 630 in FIG. 6A.

The viewing data 718a of the first training data 730a may be based on the screen data 714a of the smart TV household data 720 and the STB data 712c of the STB household data 724. In some instances, the viewing data 718a may be based on the screen data 714b and the STB data 712b of the common household data 722. The viewing data 718a may be the same as or similar to, in at least some aspects, the viewing data 618 of the training data 630 in FIG. 6A. The viewing data 718a may be associated with a particular time window or cross-section of viewing activity. The STB data 712c used to determine the viewing data 718a may be down-sampled, such as by 10%.

The viewing data 718a of the first training data 730a may be determined by scaling one or more of the screen data 714a and the STB data 712c. The scaling may be the same as or similar to the scaling described in reference to the smart TV household data 620 and STB household data 624 in FIG. 6A. In instances where the viewing data 718a is further based on the screen data 714b and/or the STB data 712b of the common household data 722, the screen data 714b and/or the STB data 712b may be scaled. As with the scaling described in reference to FIG. 6A, scaling any of the above screen or STB data may be done to normalize the body of viewing data and/or to best represent the actual viewing activity in a household. For example, viewing data reported for a household may be scaled up to compensate for unreported viewing activity at the household.

The screen data 714a of the smart TV household data 720 may be scaled based on the common household data 722. For example, the scaling factors and other parameters for scaling the screen data 714a may be based on a prior analysis of the screen data 714b and the STB data 712b of the common household data 722. Such an analysis may include identifying matched smart TV and set-top box pairs at respective common households, for example. In some instances, the screen data 714a may be scaled according to a set scaling factor. In other instances, the screen data 714a may be scaled according to a variable scaling factor. The particular variable scaling factor used to scale the screen data for a household may be based on a number (hypothetical or actual) of set-top boxes attributed to the household. A hypothetical number of set-top boxes attributed to smart TV household may be randomly determined. A hypothetical number of set-top boxes attributed to a smart TV household may be based on other features of a smart TV household that correlate to the number of set-top boxes at a smart TV household, such as demographic characteristics.

The STB data 712c for an STB household may be scaled based on the number of set-top boxes at the household, such as the number of reporting set-top boxes at the household. The STB data 712c for an STB household may be scaled based on an expected total number of set-top boxes at the household, including both reporting and non-reporting set-top boxes.

Truncation techniques may also be applied to the screen data 714a to determine the viewing data 718a. Truncation techniques may also be applied to the viewing data 718a itself. The truncation techniques may be based on the common household data 722. Truncation may comprise filtering or disregarding portions of viewing data in the screen data 714a. For example, duplicative viewing data, such as in the STB data 712b and the screen data 714b, may be identified and excluded from the viewing data 718a.

The hybrid model 738 may be determined based on the first training data 730a and via machine learning techniques, such as decision tree learning or other supervised machine learning techniques. The demographic data 710a may comprise the input object(s) of the first training data 730a and the viewing data 718a may comprise the output value(s) of the first training data 730a. Gradient boosting may be applied in the decision tree learning.

With regard to the STB model 740, the demographic data 710b of the second training data 730b may be based on the demographic data 716c of the STB household data 724. The demographic data 710b may be the same as or similar to, in at least some aspects, the demographic data 610 of the training data 630 in FIG. 6A, although the demographic data 710b may exclude demographic data associated with smart TV households and common households.

The viewing data 718b of the second training data 730b may be based on the STB data 712c of the STB household data 724. The viewing data 718b may comprise an aggregate of the STB data 712c. The viewing data 718b may be the same as or similar to, in at least some aspects, the viewing data 618 of the training data 630 in FIG. 6A, although the viewing data 718b may exclude screen data associated with smart TV households, screen data associated with common households, and STB data associated with common households. The viewing data 718b may be associated with a particular time window or cross-section of viewing activity. The STB data 712c used to determine the viewing data 718b may be down-sampled, such as by 10%.

The viewing data 718b of the second training data 730b may be determined by scaling the STB data 712c. The scaling may be the same as or similar to the scaling described in reference to the STB household data 624 in FIG. 6A. The STB data 712c for an STB household may be scaled based on the number of set-top boxes at the household, such as the number of reporting set-top boxes at the household. The STB data 712c for an STB household may be scaled based on an expected total number of set-top boxes at the household, including both reporting and non-reporting set-top boxes.

Truncation techniques may also be applied to the STB data 712c to determine the viewing data 718b. Truncation techniques may also be applied to the viewing data 718b itself. The truncation techniques may be based on the common household data 722. Truncation may comprise filtering or disregarding portions of viewing data in the STB data 712c.

The STB model 740 may be determined based on the second training data 730b and via machine learning techniques, such as decision tree learning or other supervised machine learning techniques. The demographic data 710b may comprise the input object(s) of the second training data 730b and the viewing data 718b may comprise the output value(s) of the second training data 730b. Gradient boosting may be applied in the decision tree learning.

The ensemble model 732 may be determined based on the hybrid model 738 and the STB model 740. The ensemble model 732 may be determined via ensemble learning methods.

In the data flow diagram 750, the viewership data 736 may be determined based on the ensemble model 732 and the viewing audience demographic data 734. The viewing audience demographic data 734 may be input to the ensemble model 732 to determine (e.g., output) the viewership data 736. The viewing audience demographic data 734 and the viewership data 736 may be the same as or similar to the viewing audience demographic data 634 and the viewership data 636 in FIG. 6A, respectively.

The viewing audience demographic data 734 may be similar to the demographic data 710a, 710b with respect to form and represented demographic attributes. Yet the viewing audience demographic data 734 may represent a different (e.g., larger) viewing audience than that represented, separately or combined, in the demographic data 710a, 710b. The viewing audience represented in the demographic data 710a, 710b may be a sample of a larger viewing audience represented in the viewing audience demographic data 734. The viewing audience demographic data 734 may represent a national viewing audience or a viewing audience for a media market, as some examples.

The viewership data 736 may comprise viewership metrics (e.g., ratings) for the viewing audience associated with the input viewing audience demographic data 734. The viewership data 736 may comprise projected future viewing activity or projected future viewership metrics for the viewing audience. The viewership data 736 data may be associated with a particular television/cable network or channel. The viewership data 736 may be associated with particular video programming. The viewership data 736 may be associated with a defined segment of the viewing audience (e.g., a rolled-up audience segment). Such audience segment may be defined with respect to, for example, demographic attribute(s), geographic region, or media market. The viewership data 736 may indicate a probability that a household views particular video programming (e.g., a television/cable network or channel) and for how long.

Figure 8:
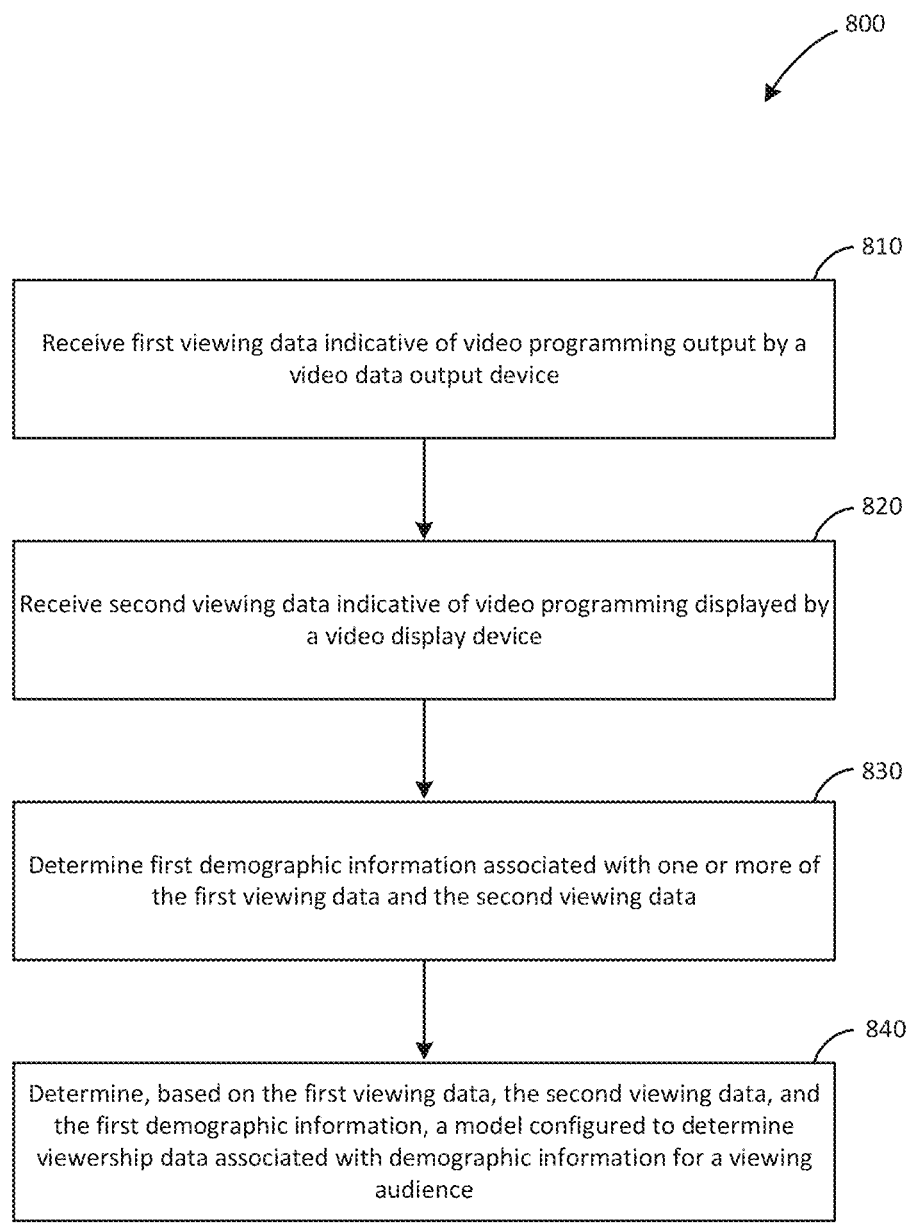
FIG. 8 illustrates an example method flow diagram.

FIG. 8 illustrates an example flow diagram of a method 800 to determine a model configured to determine viewership data. The method 800 may be performed by the viewership analysis system 124 of FIG. 1.

At step 810, first viewing data may be received. The first viewing data may be indicative of video programming output by a plurality of video data output devices, such as the set-top boxes 108 in FIG. 1 and described throughout the application. The plurality of video data output devices may be located at respective households of a first plurality of households. The first plurality of households may comprise STB households, such as the household 102a in FIG. 1 or the STB households associated with STB household data 624, 724 in FIGS. 6A and 7A, respectively. The first viewing data may comprise STB data, such as that described in relation to FIGS. 1-5. The first viewing data may comprise aggregated STB data from the first plurality of households. The first viewing data may be determined by one or more video data output devices based on the video programming output by the respective video data output devices. The first viewing data may be received from the plurality of video data output devices and/or the respective households of the first plurality of households.

At step 820, second viewing data may be received. The second viewing data may be indicative of video programming displayed by a plurality of video display devices, such as the smart TVs 106 in FIG. 1 and described throughout the application. The plurality of video display devices may be located at respective households of a second plurality of households. The second plurality of households may comprise smart TV households, such as the household 102d in FIG. 1 or the smart TV households associated with the smart TV household data 620, 720 in FIGS. 6A and 7A, respectively. The second viewing data may comprise screen data, such as that described in relation to FIGS. 1-5. The second viewing data may be determined by one or more of the video display devices based on the video programming displayed by the respective video display devices. The second viewing data may be received from the plurality of video display devices and/or the respective households of the second plurality of households. The second viewing data may be determined via automatic content recognition (ACR) at a video display device.

At step 830, first demographic information associated with one or more (e.g., both) of the first viewing data and the second viewing data may be determined. The first demographic information may be associated with the first and/or second pluralities of households. The first demographic information may comprise the portion of the demographic data 216 overlapping with one or both of the screen data 214 and the STB data 212 in FIG. 2. The first demographic information may comprise one or more of the demographic data 616a, 616c in FIG. 6A and/or one or more of the demographic data 716a, 716c in FIG. 7A.

At step 840, a model may be determined. The model may be determined based on the first viewing data, the second viewing data, and the first demographic information. The model may be configured to determine viewership data associated with demographic information for a viewing audience ("viewing audience demographic information"). The model may comprise the model 632 of FIGS. 6A and 6B and/or the ensemble model 732 of FIGS. 7A and 7B. The viewership data may comprise the viewership data 636, 736 of FIGS. 6B and 7B, respectively. The viewership data may comprise at least one of television ratings, viewing metrics, historic viewing activity, or projected viewing activity.

The viewing audience demographic information may comprise the viewing audience demographic data 634, 734 of FIGS. 6B and 7B, respectively. The viewing audience demographic information may be associated with a third plurality of households comprising one or more households that is in neither the first plurality of households nor the second plurality of households. The viewership data may be associated with the third plurality of households. The third plurality of households may comprise a viewing audience and the first and second pluralities of households may comprise a sample or sub-population of the third plurality of households (e.g., a sample viewing audience).

The method 800 may further comprise receiving the viewing audience demographic information and determining, based on the viewing audience demographic information, the viewership data associated with the viewing audience demographic information. The model may be determined via machine learning, such as decision tree learning. Determining the model may comprise gradient boosting and/or ensemble learning. The first and second viewing data and the first demographic information may comprise a training data set for determining the model. The first demographic information may comprise the training data input and the first and second viewing data may comprise the training data output for determining the model.

The method 800 may further comprise receiving third viewing data indicative of video programming output by a second plurality of video data output devices (e.g., set-top boxes) located at respective households of a third plurality of households and receiving fourth viewing data indicative of video programming displayed by a second plurality of video display devices (e.g., smart TVs) located at the respective households of the third plurality of households. The third plurality of households may comprise common households, such as the households 102b, 102c in FIG. 1 and the common households associated with the common household data 622, 722 in FIGS. 6A and 7A, respectively. Each common household may comprise a video data output device and a video display device. A common household may comprise one or more matched pairs of a video data output device and video display device (e.g., the video data output device outputs video programming to the video display device and the video display device displays at least a portion of the video programming output by the video data output device). A common household may comprise no matched pairs. The model may be determined further based on the presence of a matched pair at a common household. For example, viewing data associated with a common household having a matched pair may be truncated, such as filtering or disregarding at least a portion of the viewing data in viewership analysis.

The method 800 may further comprise scaling, based on the third viewing data and the fourth viewing data (e.g., common household data), at least a portion of the second viewing data. The scaling may be based on a quantity of one or more video output devices attributed to a household of the second plurality of households. The attributed quantity may be an actual number of video output devices at a household of the second plurality of households. The attributed quantity may be a randomly determined quantity of video output devices. For example, an attributed quantity may be randomly determined when no video output devices are present at a household of the second plurality of households. The method 800 may further comprise scaling at least a portion of the first viewing data. The scaling may be based on a quantity of one or more video data output devices at a household of the first plurality of households.

Figure 9:
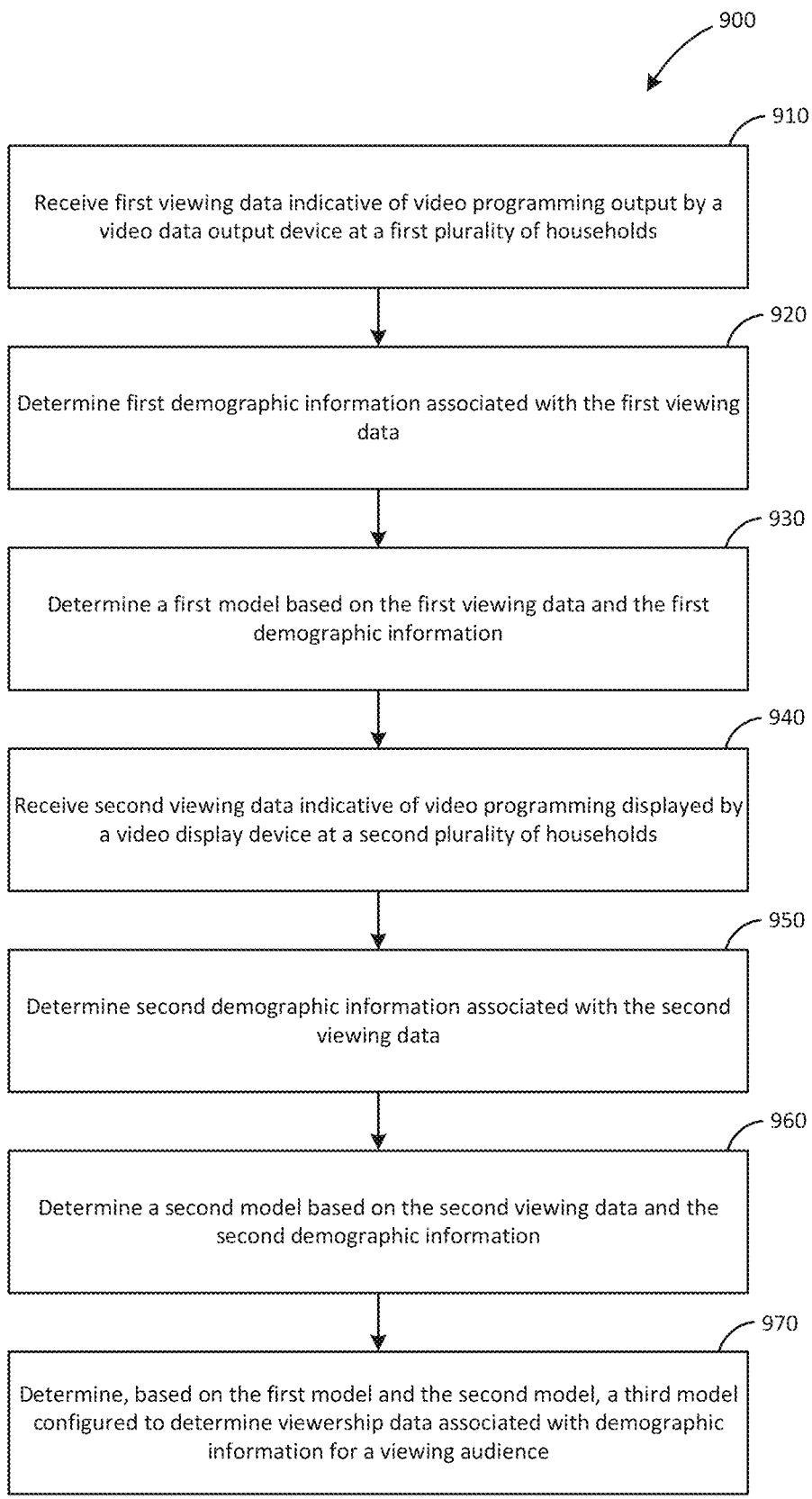
FIG. 9 illustrates an example method flow diagram.

FIG. 9 illustrates an example flow diagram of a method 900 to determine a model configured to determine viewership data. The method 900 may be performed by the viewership analysis system 124 of FIG. 1.

At step 910, first viewing data may be received. The first viewing data may be indicative of video programming output by a plurality of video data output devices, such as set-top boxes. The first plurality of households may comprise STB households. The first viewing data may comprise STB data. The first viewing data may comprise aggregated STB data from the first plurality of households. The first viewing data may be determined by one or more video data output devices based on the video programming output by the respective video data output devices. The first viewing data may be received from the plurality of video data output devices and/or the respective households of the first plurality of households.

At step 920, first demographic information associated with the first viewing data may be determined. The first demographic information may be associated with the first plurality of households. At step 930, a first model may be determined. The first model may be determined based on the first viewing data and the first demographic information. The first model may comprise the STB model 740 of FIG. 7A. The first model may be determined via machine learning. The training data set for the machine learning may comprise the first viewing data and the first demographic information. The first demographic information may comprise the training data input and the first viewing data may comprise the training data output.

At step 940 second viewing data may be received. The second viewing data may be indicative of video programming displayed by a plurality of video display devices, such as smart TVs. The plurality of video display devices may be located at respective households of a second plurality of households. The second plurality of households may comprise smart TV households. The second viewing data may comprise screen data. The second viewing data may be determined by one or more of the video display devices based on the video programming displayed by the respective video display devices. The second viewing data may be received from the plurality of video display devices and/or the respective households of the second plurality of households. The second viewing data may be determined via automatic content recognition (ACR) at a video display device.

At step 950, second demographic information associated with the second viewing data may be determined. The second demographic information may be associated with the second plurality of households. The first plurality of households and the second plurality of households may be independent of one another. The first plurality of households may comprise no household of the second plurality of households and the second plurality of households may comprise no households of the first plurality of households.

At step 960, a second model may be determined. The second model may be determined based on the second viewing data and the second demographic information. The second model may comprise the hybrid model 738 of FIG. 7A. The second model may be determined via machine learning. The training data set for the machine learning may comprise the second viewing data and the second demographic information. The second demographic information may comprise the training data input and the second viewing data may comprise the training data output. The second model may be determined further based on the first viewing data and the first demographic information. The training data output may further comprise the first viewing data and the training data input may further comprise the first demographic information.

At step 970, a third model may be determined. The third model may be determined based on the first model and the second model. The third model may be configured to determine viewership data associated with demographic information for a viewing audience ("viewing audience demographic information"). The third model may be determined via ensemble learning, with the first model and the second model being inputs to the ensemble learning. The third model may comprise the ensemble model 732 of FIGS. 7A and 7B. The viewership data may comprise the viewership data 636, 736 of FIGS. 6B and 7B, respectively. The viewership data may comprise at least one of television ratings, viewing metrics, historic viewing activity, or projected viewing activity.

The viewing audience demographic information may comprise the viewing audience demographic data 634, 734 of FIGS. 6B and 7B, respectively. The viewing audience demographic information may be associated with a third plurality of households comprising one or more households that is in neither the first plurality of households nor the second plurality of households. The viewership data may be associated with the third plurality of households. The third plurality of households may comprise a viewing audience and the first and second pluralities of households may comprise a sample or sub-population of the third plurality of households (e.g., a sample viewing audience).

The method 900 may further comprise receiving third viewing data (e.g., STB data) indicative of video programming output by a second plurality of video data output devices located at respective households of a third plurality of households and receiving fourth viewing data (e.g., screen data) indicative of video programming displayed by a second plurality of video display devices located at the respective households of the third plurality of households. The third plurality of households may comprise common households. At least a portion of the second viewing data may be scaled based on the third viewing data and the fourth viewing data.

Figure 10:
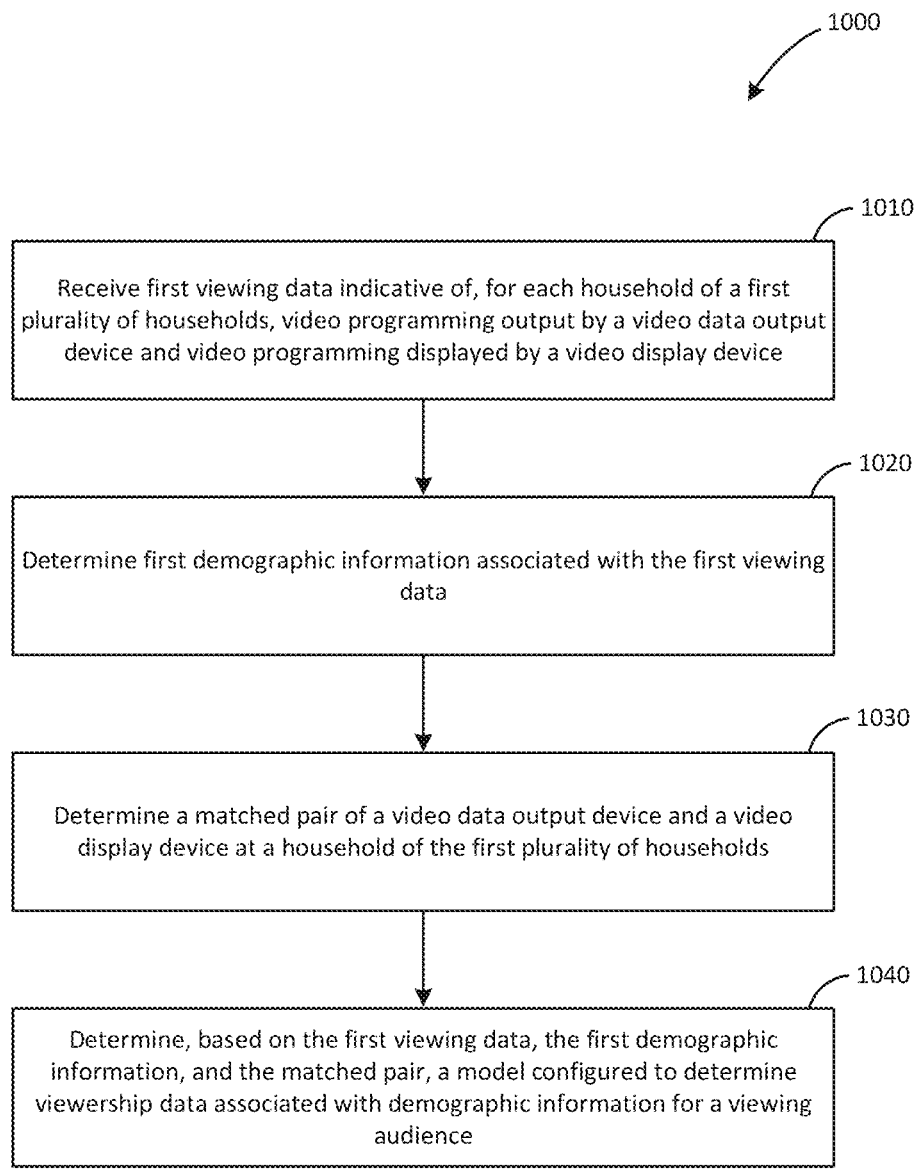
FIG. 10 illustrates an example method flow diagram.

FIG. 10 illustrates an example flow diagram of a method 1000 to determine a model configured to determine viewership data. The model may be based on determining a matched pair of a video data output device (e.g., a set-top box) and a video display device (e.g., a smart TV) at a household. The method 1000 may be performed by the viewership analysis system 124 of FIG. 1.

At step 1010, first viewing data associated with a first plurality of households may be received. The first viewing data may be indicative of, for each household of the first plurality of households, video programming output by one or more video data output devices located at the household and video programming displayed by one or more video display devices located at the household. The first plurality of households may comprise a plurality of common households. The first viewing data may comprise common household data, such as the common household data 622, 722 of FIGS. 6A and 7A, respectively. A portion of the first viewing data indicative of video programming output by a video data output device may comprise STB data of the common household data, such as the STB data 612b, 712b of FIGS. 6A and 7A, respectively, and the STB data 512 of FIG. 5. A portion of the first viewing data indicative of video programming displayed by a video display device may comprise screen data of the common household data, such as the screen data 614b, 714b of FIGS. 6A and 7A, respectively, and the screen data 514 of FIG. 5.

At step 1020, first demographic information may be determined. The first demographic information may be associated with the first viewing data. The first demographic information may be associated with the first plurality of households.

At step 1030, a matched pair of a (matched) video data output device and a (matched) video display device at a household of the first plurality of households may be determined. The matched pair may comprise the matched devices 552 of FIG. 5. Determining the matched pair may comprise determining, for a household of the first plurality of households, a matched video data output device of the one or more video data output devices and a matched video display device of the one or more video display devices at the household. The matched video display device may display video programming based on a least a portion of the video programming output by the matched video data output device. The matched video display device may display at least a portion of the video programming output by the matched video data output device. At least a portion of the video programming output by the matched video data output device may be displayed by the matched video display device.

At step 1040, a model may be determined based on the first viewing data, the first demographic information, and the matched pair of the matched video data output device and the matched video display device. The model may be configured to determine viewership data associated with demographic information for a viewing audience ("viewing audience demographic information"). The model may comprise the model 632 of FIGS. 6A and 6B, the hybrid model 738 of FIG. 7A, or the ensemble model 732 of FIGS. 7A and 7B. The viewership data may comprise the viewership data 636, 736 of FIGS. 6B and 7B, respectively. The viewership data may comprise at least one of television ratings, viewing metrics, historic viewing activity, or projected viewing activity.

The viewing audience demographic information may comprise the viewing audience demographic data 634, 734 of FIGS. 6B and 7B, respectively. The viewing audience demographic information may be associated with a second plurality of households comprising one or more households that is not in the first plurality of households. The viewership data may be associated with the second plurality of households. The second plurality of households may comprise a viewing audience and the first pluralities of households may comprise a sample or sub-population of the second plurality of households (e.g., a sample viewing audience).

Determining the model may comprise truncating at least a portion of the first viewing data based on the determining the matched pair of the matched video data output device and the matched video display device. Such truncation may be based on a truncation model (e.g., the truncation model 554 of FIG. 5) determined from common household data. The truncated portion of the first viewing data may be associated with the household having the matched pair. The truncated portion of the first viewing data may be associated with at least one of the matched video data output device and the matched video display device. For example, the truncated portion of the first viewing data may be associated with the matched video data output device. Truncating the portion of the first viewing data may comprise filtering or disregarding the portion of the first viewing data in viewership analysis, such as determining the model.

Determining the matched pair of the matched video data output device and the matched video display device may comprise comparing the video programming output, during a time period, by the matched video data output device and the video programming displayed, during the time period, by the matched video display device during the time period. Comparing the video programming may comprise comparing one or more networks associated with the video programming output, during the time period, by the matched video data output device and one or more networks associated with the video programming displayed, during the time period, by the matched video display device.

Determining the matched pair may comprise determining a similarity score for the matched pair. The similarity score may be based on a number of networks common to the one or more networks associated with the video programming output by the matched video data output device and the one or more networks associated with the video programming displayed by the matched video display device. The similarity score may be further based on a total number of networks of the one or more networks associated with the video programming output by the matched video data output device. The similarity score may be further based on a total number of networks of the one or more networks associated with the video programming displayed by the matched video display device. The similarity score may be determined according to Eq. (1).

The method 1000 may further comprise receiving second viewing data indicative of, for each household of a second plurality of households, video programming output by a video data output device located at the household of the second plurality of households. The second viewing data may comprise STB data and the second plurality of households may comprise STB households. The method 1000 may further comprise receiving third viewing data indicative of, for each household of a third plurality of households, video programming displayed by a video display device located at the household of the third plurality of households. The third viewing data may comprise screen data and the third plurality of households may comprise smart TV households.

The method 1000 may further comprise determining second demographic information associated with one or more of the second plurality of households and the third plurality of households. The model may be further based on the second viewing data, the third viewing data, and the second demographic information.

The model may be determined via machine learning, such as decision tree learning. The training data set for the machine learning may comprise the second demographic information, the second viewing data and the third viewing data. The second demographic information may comprise the training data input and the second and third viewing data may comprise the training data output. The training data set for the machine learning may additionally or alternatively comprise the first demographic information and the first viewing data. The training data input may additionally or alternatively comprise the first demographic information and the training data output may additionally or alternatively comprise the first viewing data.

Figure 11:
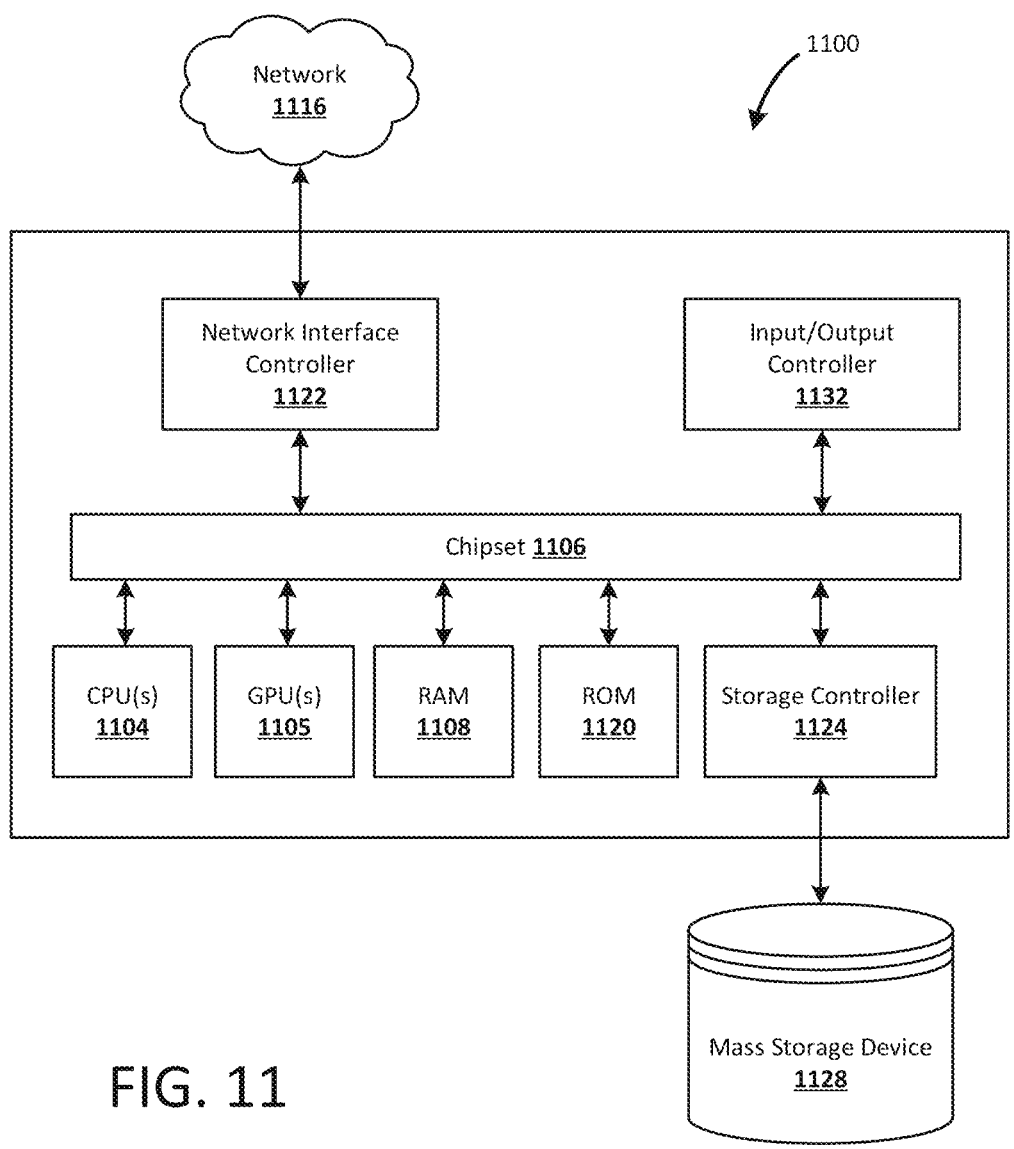
FIG. 11 illustrates an example block diagram of a computing device.

FIG. 11 depicts an example computing device in which the systems, methods, and devices disclosed herein, or all or some aspects thereof, may be embodied. For example, components such as set-top boxes, smart TVs, televisions, network devices, viewership analysis systems may be implemented generally in a computing device, such as the computing device 1100 of FIG. 11. The computing device of FIG. 11 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN) 1116. The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on a mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and nonremovable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   receiving viewing data associated with a household, wherein a first portion of the viewing data is indicative of video programming associated with a first video device and a second portion of the viewing data is indicative of video programming associated with a second video device;
   determining one or more characteristics associated with the first portion of the viewing data and the second portion of the viewing data;
   comparing the video programming associated with the first video device and the video programming associated with the second video device; and
   determining, based on the one or more characteristics and the comparing, that the first portion of the viewing data is duplicative, at least in part, with the second portion of the viewing data.

2. The method of claim 1, further comprising:
   excluding the duplicative viewing data of the first portion of the viewing data from the viewing data.

3. The method of claim 2, further comprising:
   determining, based on the viewing data with the duplicative viewing data excluded, viewership data, wherein the viewership data comprises at least one of television ratings, viewing metrics, historic viewing activity, or projected viewing activity.

4. The method of claim 1, wherein the first portion of the viewing data is determined by the first video device and the second portion of the viewing data is determined by the second video device.

5. The method of claim 1, further comprising:
   determining that the first video device is configured to output video programming to the second video device and the second video device is configured to display the viewing programming output by the first video device.

6. The method of claim 5, wherein:
   the first video device comprises at least one of a smart TV, a television, a computer display, an LCD display, an LED display, or a video projector, and the second video device comprises at least one of a cable set-top box, an over-the-top (OTT) device, a satellite television set-top box, a digital media player, a digital television adaptor, a digital video recorder (DVR), or a network device.

7. The method of claim 1, wherein the comparing the video programming associated with the first video device and the video programming associated with the second video device comprises comparing a first time period associated with the video programming associated with the first video device and a second time period associated with the video programming associated with the second video device.

8. The method of claim 1, wherein the comparing the video programming associated with the first video device and the video programming associated with the second video device comprises comparing a first video asset associated with the video programming associated with the first video device and a second video asset associated with the video programming associated with the second video device.

9. The method of claim 1, wherein the one or more characteristics comprise a classification of the household as one of SD dominant, HD dominant, or Ultra HD dominant.

10. The method of claim 1, wherein the one or more characteristics comprise a video quality classification of one or more of the video programming associated with first video device or the video programming associated with the second video device.

11. The method of claim 1, wherein at least one of the first video device or the second video device comprises a video display device and the one or more characteristics comprises an input categorization associated with the at least one of the first video device or the second video device.

12. The method of claim 1, wherein the one or more characteristics comprise an IP address associated with a video source of at least one of the video programming associated with the first video device or the video programming associated with the second video device.

13. A method comprising:
receiving first viewing data that is indicative of video programming output by a video output device located at a household and second viewing data that is indicative of video programming displayed by a video display device located at the household;
determining a first characteristic associated with the first viewing data and a second characteristic associated with the second viewing data;
comparing the video programming output by the video output device and the video programming output by the second viewing; and
determining, based on the first characteristic, the second characteristic, and the comparing, duplicative viewing data in at least one of the first viewing data or the second viewing data that is duplicative between the first viewing data and the second viewing data.

14. The method of claim 13, further comprising:
excluding the duplicative viewing data from the at least one of the first viewing data or the second viewing data.

15. The method of claim 13, wherein the first viewing data is determined by the video output device and the second viewing data is determined by the video display device.

16. The method of claim 13, further comprising:
determining that the video output device is configured to output video programming to the video display device and the video display device is configured to display the video programming output by the video output device.

17. A device comprising:
one or more processors; and
memory storing instructions that, when executed by the one or more processors, cause the device to:
receive viewing data associated with a household, wherein a first portion of the viewing data is indicative of video programming associated with a first video device and a second portion of the viewing data is indicative of video programming associated with a second video device;
determine one or more characteristics associated with the first portion of the viewing data and the second portion of the viewing data;
compare the video programming associated with the first video device and the video programming associated with the second video device; and
determine, based on the one or more characteristics and the comparing, that the first portion of the viewing data is duplicative, at least in part, with the second portion of the viewing data.

18. The device of claim 17, wherein the instructions, when executed by the one or more processors, further cause the device to:
exclude the duplicative viewing data of the first portion of the viewing data from the viewing data.

19. The device of claim 17, wherein the first portion of the viewing data is determined by the first video device and the second portion of the viewing data is determined by the second video device.

20. The device of claim 17, wherein the instructions, when executed by the one or more processors, further cause the device to:
determine that the first video device is configured to output video programming to the second video device and the second video device is configured to display the video programming output by the first video device.

* * * * *